(12) United States Patent
Liao et al.

(10) Patent No.: US 11,846,997 B2
(45) Date of Patent: Dec. 19, 2023

(54) ROTATING SHAFT MECHANISM AND MOBILE TERMINAL

(71) Applicant: Huawei Technologies Co., Ltd., Shenzhen (CN)

(72) Inventors: Li Liao, Dongguan (CN); Kenji Nagai, Yokohama (JP); Changliang Liao, Dongguan (CN); Ding Zhong, Dongguan (CN); Tao Huang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 424 days.

(21) Appl. No.: 17/322,265

(22) Filed: May 17, 2021

(65) Prior Publication Data

US 2021/0271294 A1 Sep. 2, 2021

Related U.S. Application Data

(63) Continuation of application No. PCT/CN2019/130906, filed on Dec. 31, 2019.

(30) Foreign Application Priority Data

Mar. 15, 2019 (CN) .......................... 201910196111.7

(51) Int. Cl.
*G06F 1/16* (2006.01)
*G06F 1/18* (2006.01)

(52) U.S. Cl.
CPC .......... *G06F 1/1681* (2013.01); *G06F 1/1652* (2013.01); *G06F 1/181* (2013.01)

(58) Field of Classification Search
CPC ..... E05D 3/122; E05D 3/18; E05Y 2900/606; G06F 1/1681; G06F 1/1616; G06F 1/1618; G06F 1/1651; G06F 1/181
See application file for complete search history.

(56) References Cited

U.S. PATENT DOCUMENTS

| | | | | |
|---|---|---|---|---|
| 9,518,414 B1 * | 12/2016 | Chen | ...................... | E05D 11/082 |
| 10,036,188 B1 * | 7/2018 | Yao | ...................... | G06F 1/1681 |
| 10,761,574 B1 * | 9/2020 | Hsu | ...................... | G06F 1/1626 |
| 11,726,530 B2 * | 8/2023 | Kang | ...................... | G06F 1/1652 |
| | | | | 361/679.27 |
| 2015/0233162 A1 | 8/2015 | Lee et al. | | |
| 2016/0150657 A1 | 5/2016 | Myeong et al. | | |

(Continued)

FOREIGN PATENT DOCUMENTS

| | | |
|---|---|---|
| CN | 105096756 A | 11/2015 |
| CN | 106559530 A | 4/2017 |

(Continued)

*Primary Examiner* — Sagar Shrestha
(74) *Attorney, Agent, or Firm* — Slater Matsil, LLP

(57) ABSTRACT

A connection rod and a swing arm are separately rotatably connected to a primary shaft component, and an axis around which the swing arm rotates and an axis around which the connection rod rotates are different, so that the swing arm and the connection rod rotate and slide relative to each other. The swing arm or the connection rod drives a support plate to rotate, so that the primary shaft component and the support plates can encircle to form, when the mobile terminal is completely folded, space that accommodates a folded part of a flexible display.

20 Claims, 17 Drawing Sheets

(56) References Cited

U.S. PATENT DOCUMENTS

| | | | |
|---|---|---|---|
| 2016/0324023 A1 | 11/2016 | Kim et al. | |
| 2019/0268456 A1* | 8/2019 | Park | H04M 1/0216 |
| 2020/0103935 A1* | 4/2020 | Hsu | G06F 1/1681 |
| 2020/0267851 A1* | 8/2020 | Hou | H04M 1/022 |
| 2020/0310497 A1* | 10/2020 | Hsu | E05D 3/18 |
| 2020/0348732 A1* | 11/2020 | Kang | G06F 1/1681 |
| 2020/0363843 A1* | 11/2020 | Cheng | H04M 1/02 |
| 2020/0409429 A1* | 12/2020 | Hsu | G06F 1/1681 |
| 2021/0014989 A1* | 1/2021 | Hsu | H04M 1/0268 |
| 2021/0034116 A1* | 2/2021 | Torres | G06F 1/1616 |
| 2021/0067614 A1* | 3/2021 | Cheng | G06F 1/1681 |
| 2021/0250431 A1* | 8/2021 | Park | H04M 1/0268 |
| 2021/0373612 A1* | 12/2021 | Hwang | H04M 1/0268 |
| 2022/0400565 A1* | 12/2022 | Shin | G06F 1/1616 |

FOREIGN PATENT DOCUMENTS

| | | |
|---|---|---|
| CN | 108322567 A | 7/2018 |
| CN | 207977989 U | 10/2018 |
| CN | 108874048 A | 11/2018 |
| CN | 109256048 A | 1/2019 |
| CN | 109257460 A | 1/2019 |
| CN | 208353382 U | 1/2019 |
| CN | 208421695 U | 1/2019 |
| CN | 109451112 A | 3/2019 |
| EP | 3155498 A1 | 4/2017 |
| JP | 2002369709 A | 12/2002 |
| KR | 20110034189 A | 4/2011 |
| KR | 101329946 B1 | 11/2013 |
| KR | 20180005476 A | 1/2018 |

\* cited by examiner

ROTATING SHAFT MECHANISM AND MOBILE TERMINAL

CROSS-REFERENCE TO RELATED APPLICATIONS

This application is a continuation of International Application No. PCT/CN2019/130906, filed on Dec. 31, 2019, which claims priority to Chinese Patent Application No. 201910196111.7, filed on Mar. 15, 2019. The disclosures of the aforementioned applications are hereby incorporated by reference in their entireties.

TECHNICAL FIELD

This disclosure relates to the field of mobile terminal technologies, and in particular, to a rotating shaft mechanism and a mobile terminal.

BACKGROUND

As flexible display technologies become increasingly mature, a foldable terminal product will be undoubtedly a major trend in the future. To be accepted by consumers, a foldable terminal product (for example, an electronic device such as a foldable mobile phone, a foldable tablet, or a foldable computer) needs to satisfy relatively high reliability and relatively good operation experience and ID appearance. A foldable mobile phone is used as an example. Different from a previous flip phone, a foldable mobile phone has a continuously foldable screen. Therefore, to ensure that the foldable screen is not torn or squeezed, a bent hinge part in the middle of appearance of an entire system of the product is greatly deformed. However, a general structure cannot be greatly deformed to such an extent. Therefore, in a foldable terminal product, a special hinge needs to be designed for a bent and deformed part, to satisfy requirements such as operation experience, appearance, and reliability of an entire system of the product. However, a thickness of a used bent hinge part in the prior art after folding is greater than a thickness of an entire system, affecting a folding effect of a terminal.

SUMMARY

This disclosure provides a rotating shaft mechanism and a mobile terminal, to improve a folding effect of the mobile terminal.

According to a first aspect, a rotating shaft mechanism is provided, where the rotating shaft mechanism is applied to a foldable mobile terminal and is used as a foldable mechanism of the mobile terminal, the rotating shaft mechanism is fixedly connected to two housings of the mobile terminal, and when the mobile terminal is folded, the two housings rotate around the rotating shaft mechanism to implement folding. When the rotating shaft mechanism is specifically disposed, the rotating shaft mechanism includes a primary shaft component, a swing arm component, and a support component. The primary shaft component is a support piece, and the swing arm component is configured to connect the support component to the primary shaft component. To improve a folding effect of the mobile terminal, the swing arm component is used to change a movement manner of the support component. The swing arm component includes at least one connection rod group and at least one swing arm group. Each connection rod group includes two connection rods that are correspondingly disposed on two sides of the primary shaft component and that are rotatably connected to the primary shaft component. Each swing arm group includes swing arms that are separately disposed on the two sides of the primary shaft component, and the swing arms are configured to fixedly connect to the two housings of the mobile terminal. In addition, each swing arm is rotatably connected to the primary shaft component, and an axis around which each swing arm rotates and an axis around which a corresponding connection rod rotates are different and are both parallel to a length direction of the primary shaft component. Each swing arm is slidably connected to and can rotate relative to at least one connection rod located on the same side. When the swing arm component supports the support component, the support component includes support plates correspondingly disposed on the two sides of the primary shaft component, and each support plate is rotatably connected to a swing arm located on the same side, and is slidably connected to and can rotate relative to a connection rod located on the same side. Alternatively, each support plate is rotatably connected to the primary shaft component, and is slidably connected to and can rotate relative to a swing arm located on the same side. An axis around which the support plate is rotatably connected to the swing arm or rotatably connected to the primary shaft component is parallel to the length direction of the primary shaft component. In addition, to enable the mobile terminal maintain stable folding and unfolding states, a position limiting mechanism is configured to perform locking during specific disposing. The position limiting mechanism is configured to limit relative sliding positions of the swing arm and the connection rod. During using, when the swing arms located on the two sides of the primary shaft component rotate toward each other to a first position, corresponding connection rods or the swing arms drive the two support plates to rotate toward each other to a second position, so that the support plates and the primary shaft component encircle to form folding space that accommodates a flexible display of the mobile terminal. In addition, based on rotation of the connection rod and rotation of the swing arm relative to the primary shaft component, a thickness of the foldable mechanism after folding is approximately equal to a thickness of the two housings that are stacked together, thereby improving a folding effect of the mobile terminal. In addition, the support plates and the primary shaft component encircle to form the space that accommodates the flexible display, thereby improving a bending effect of the flexible display.

When the axes around which the swing arm and the connection rod rotate are specifically disposed, axes around which the two connection rods in each connection rod group rotate are symmetrically disposed on two sides of axes around which the two swing arms in a corresponding swing arm group rotate.

When the connection rod slides relative to the swing arm, a sliding direction of the connection rod is perpendicular to an axis direction of the connection rod. When the swing arms located on the two sides of the primary shaft component rotate toward each other to the first position, the corresponding connection rod slides to a position close to the axis around which the swing arm rotates. When the connection rod and the swing arm rotate relative to each other, the connection rod slides towards an end that is close to sliding connection between the swing arm and the primary shaft component.

When the swing arm is slidably mounted to the primary shaft component, the primary shaft component is provided with a first arc-shaped chute that is in a one-to-one correspondence with each swing arm. Each swing arm is provided with a first arc-shaped arm that is slidably mounted in a corresponding first arc-shaped chute.

When the primary shaft component is specifically disposed, the primary shaft component includes an outer shaft body and an inner shaft body fixedly connected to the outer shaft body. Each first arc-shaped groove includes: a concave arc-shaped groove disposed on the outer shaft body, and an arc-shaped surface disposed on the inner shaft body and covering the arc-shaped groove.

In addition to the foregoing manner, the first arc-shaped chute may be disposed in another manner. For example, the primary shaft component includes a primary outer shaft and a primary inner shaft fixedly connected to the primary outer shaft. The first arc-shaped chute is disposed on the primary inner shaft or the primary outer shaft. In this way, a structure of the first arc-shaped chute is conveniently disposed.

When the swing arms are specifically disposed, the first arc-shaped arms on the two swing arms that are correspondingly provided in each swing arm group are disposed in a staggered manner. Therefore, a length of a sliding connection part between the swing arm and the primary shaft component can be increased, thereby improving structural stability.

When the swing arm and the primary shaft component are specifically disposed, a surface that is of the primary outer shaft and that is away from the primary inner shaft is an arc-shaped surface, and the axis around which the swing arm rotates and an axis around which the arc-shaped surface rotates are a same axis, thereby further improving the folding effect of the mobile terminal.

When the connection rod is specifically disposed, gears are separately disposed at opposite ends of the two connection rods in each connection rod group, and the two gears mesh with each other. The two meshed gears are disposed, so that the connection rods can move synchronously, thereby ensuring synchronization between the two housings when the mobile terminal is folded.

When the gears cooperate with the primary shaft component, a cavity accommodating the two meshed gears is disposed in the primary shaft component. The two gears are located in the cavity, and the two gears are separately rotatably connected to the primary shaft component. Rotatable connection between the two gears and the primary shaft component implements rotatable connection between the connection rod and the primary shaft component.

When the position limiting mechanism is specifically disposed, the position limiting mechanism includes an elastic component that is slidably mounted on the swing arm, and at least two buckle openings that are disposed on the connection rod and that are configured to buckle with the elastic component. The elastic component and the buckle openings are disposed to cooperate, to limit relative positions of the connection rod and the swing arm.

The elastic component includes a sphere and an elastic piece that pushes the sphere to buckle with the buckle opening. The elastic piece pushes the sphere to slide, and the sphere and the buckle opening cooperate, to perform locking.

When the position limiting mechanism specifically cooperates with the swing arm, different structures may be selected based on corresponding quantities of the swing arms and the connection rods. Each swing arm corresponds to at least one connection rod, and at least one elastic component cooperating with the connection rod is disposed on the swing arm. During specific disposing, each connection rod may correspond to one position limiting mechanism, or may correspond to two position limiting mechanisms. This may be specifically determined based on an actual situation.

When the swing arm specifically cooperates with the connection rod, a notch that is in a one-to-one correspondence with the corresponding connection rod is disposed on each swing arm, and the connection rod is at least partially located in the corresponding notch. In this way, a thickness after the connection rod is connected to the swing arm is reduced.

Specifically, when the swing arm is slidably connected to the connection rod, a first chute is disposed on each connection rod, and a pin shaft that is slidably mounted in the first chute is disposed on a corresponding swing arm; or a first chute is disposed on each swing arm, and a first protrusion that is slidably mounted in the first chute is disposed on the corresponding connection rod.

When the support plates are slidably connected to the swing arm or the connection rod, a second chute is disposed on each support plate; and a pin shaft that is slidably mounted in the second chute is disposed on a corresponding connection rod or swing arm; or a second chute is disposed on the connection rod or the swing arm, and a second protrusion that is slidably mounted in the second chute is disposed on a corresponding support plate.

When the support plates are rotatably connected to the swing arm, each of the support plates is rotatably connected to a corresponding swing arm by using a first pin shaft; or a second arc-shaped chute is disposed on each support plate, and a second arc-shaped arm that is slidably mounted in the second arc-shaped chute is disposed on the swing arm corresponding to each support plate. The support plate may rotate relative to the swing arm in different manners.

In a specific implementable solution, the primary shaft component has a first surface and a second surface opposite to the first surface. The first surface is used to support a surface of the flexible display. When the rotating shaft mechanism unfolds to support the flexible display, the first surface is flush to a surface that is on the support plate and that is used to support the flexible display. The first surface is disposed to be flush to the surface that is on the support plate and that supports the flexible display, to improve a supporting effect of the flexible display.

In a specific implementable solution, a flexible covering layer is further included. The flexible covering layer is fixedly connected to a surface that is of the primary shaft component and that is away from the flexible display, and two ends of the flexible covering layer are suspended and are inserted into two housings of the mobile terminal. The flexible covering layer may cover a notch on the primary shaft component, thereby improving an appearance of the mobile terminal.

In a specific implementable solution, a flexible covering layer is further included, and the flexible covering layer is fixedly connected to a surface that is of the primary shaft component and that is away from the flexible display. At least one swing arm is rotatably connected to a swing rod, and each swing rod is slidably connected to the flexible covering layer. Two ends of the flexible covering layer are fastened by using the swing rod.

In a specific implementable solution, the flexible covering layer is an elastic steel plate or an elastic plastic plate.

According to a second aspect, a mobile terminal is provided. The mobile terminal includes the rotating shaft mechanism according to any one of the foregoing descriptions and two housings, where the two housings are arranged on two sides of the primary shaft component, and each housing is fixedly connected to a swing arm located on the same side; and further includes a flexible display fixedly connected to the two housings. During using, when swing arms located on the two sides of the primary shaft component rotate toward each other to a first position, a corresponding connection rod or the swing arm drives the two support plates to rotate toward each other to a second position, and the support plates and the primary shaft component encircle to form folding space that accommodates the flexible display of the mobile terminal. In addition, based on rotation of the connection rod and rotation of the swing arm relative to the primary shaft component, a thickness of a foldable mechanism after folding is approximately equal to a thickness of the two housings that are stacked together, thereby improving a folding effect of the mobile terminal. In addition, the support plate and the primary shaft component encircle to form the space that accommodates the flexible display, thereby improving a bending effect of the flexible display.

In a specific implementable solution, the flexible display is bonded to the support plate. The flexible display is bonded to the support plate, to improve a folding effect of the flexible display.

In a specific implementable solution, a flexible covering layer is inserted into the two housings. The flexible covering layer is disposed to improve the folding effect of the mobile terminal.

DETAILED DESCRIPTION OF ILLUSTRATIVE EMBODIMENTS

To make the objectives, technical solutions, and advantages of this disclosure clearer, the following further describes this disclosure in detail with reference to the accompanying drawings.

Figure 1:
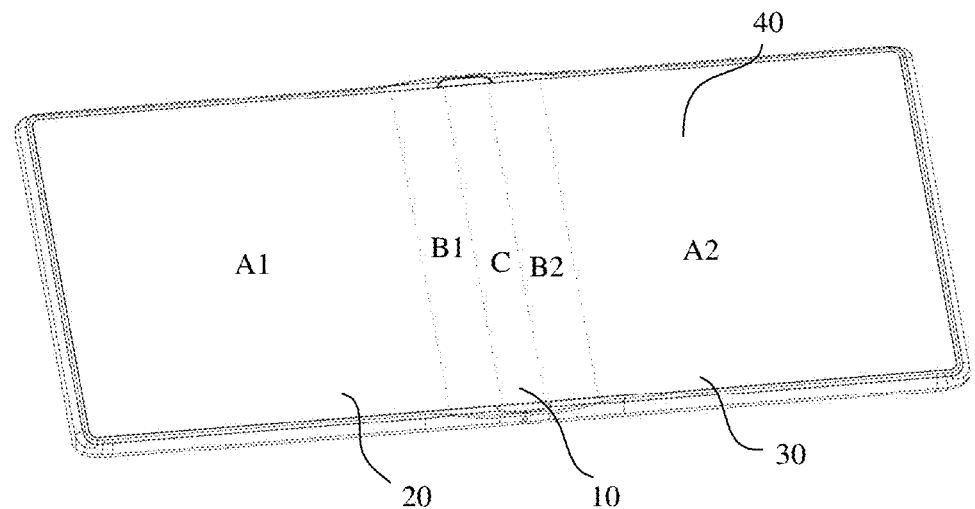
FIG. 1 is a schematic unfolded diagram of a mobile terminal according to an embodiment of this disclosure.
Figure 2:
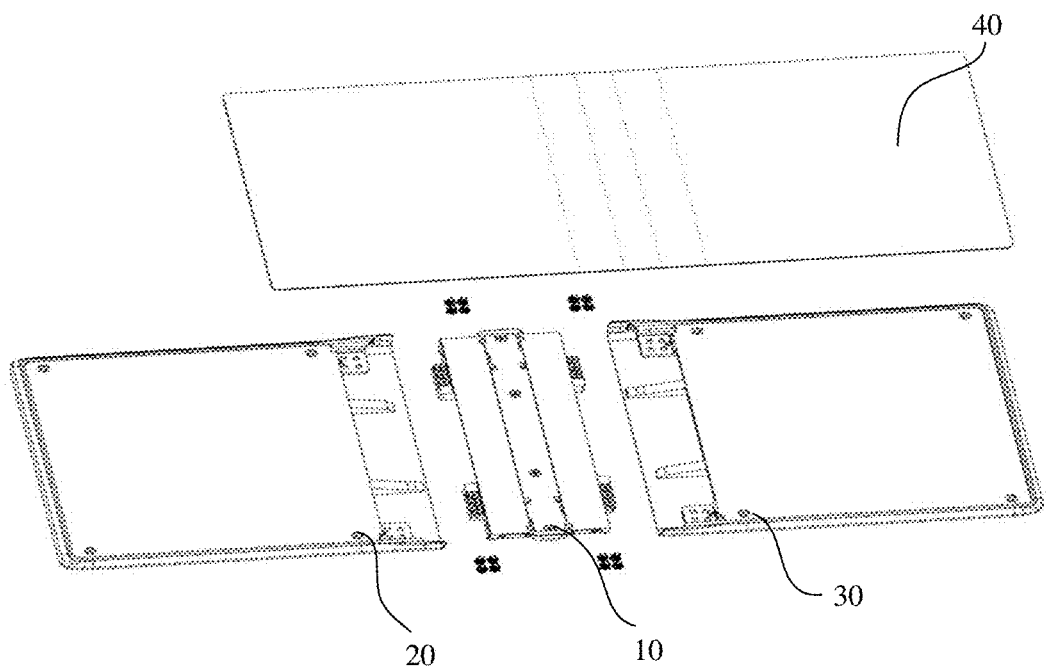
FIG. 2 is a schematic exploded view of a mobile terminal according to an embodiment of this disclosure.
Figure 3:
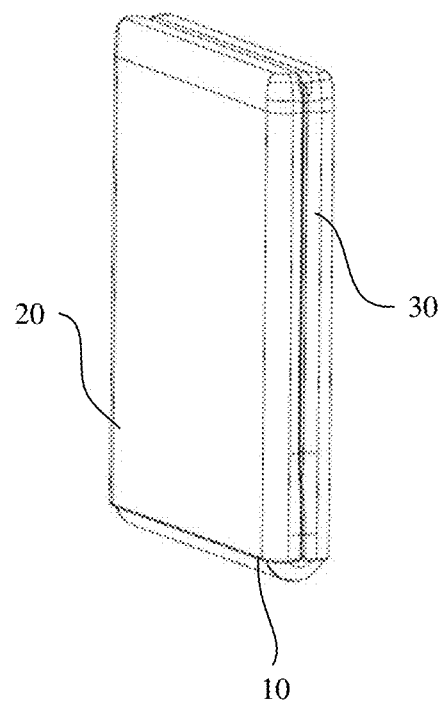
FIG. 3 is a schematic diagram of a folding state of a mobile terminal according to an embodiment of this disclosure.

To facilitate understanding of a rotating shaft mechanism provided in the embodiments of this disclosure, the following first describes a disclosure scenario of the rotating shaft mechanism. The rotating shaft mechanism is applied to a mobile terminal, and in particular, to a mobile terminal having a foldable screen, such as a mobile phone, a PDA, a notebook computer, or a tablet computer. However, no matter which mobile terminal is used, the mobile terminal includes a structure shown in FIG. 1: a left housing 20, a rotating shaft mechanism 10, a right housing 30, and a flexible display 40. Referring to both FIG. 1 and FIG. 2, the rotating shaft mechanism 10 is rotatably connected to the left housing 20 and the right housing 30, the left housing 20 and the right housing 30 rotate relative to each other by rotating the rotating shaft mechanism 10, and the flexible display 40 covers the left housing 20, the right housing 30, and the rotating shaft mechanism 10 and is connected to the left housing 20, the right housing 30, and the rotating shaft mechanism 10 (a connection manner may be bonding or the like), to form the structure shown in FIG. 1. During using, the mobile terminal includes two states: an unfolded state and a folded state. First, FIG. 1 shows the unfolded state of the mobile terminal. In this case, the rotating shaft mechanism 10 is unfolded, and the left housing 20 and the right housing 30 are arranged on two sides of the rotating shaft mechanism 10 and are unfolded. In this case, the flexible display 40 is unfolded. During bending, the left housing 20 and the right housing 30 rotate relative to each other, and the rotating shaft mechanism 10 rotates. After folding, a state shown in FIG. 3 is formed. In this case, the left housing 20 and the right housing 30 are stacked opposite to each other, and the flexible display 40 is bent along with the left housing 20 and the right housing 30. To facilitate understanding of the rotating shaft mechanism 10 provided in this embodiment of this disclosure, the following describes a structure of the rotating shaft mechanism 10 in detail with reference to the accompanying drawings.

Figure 4:
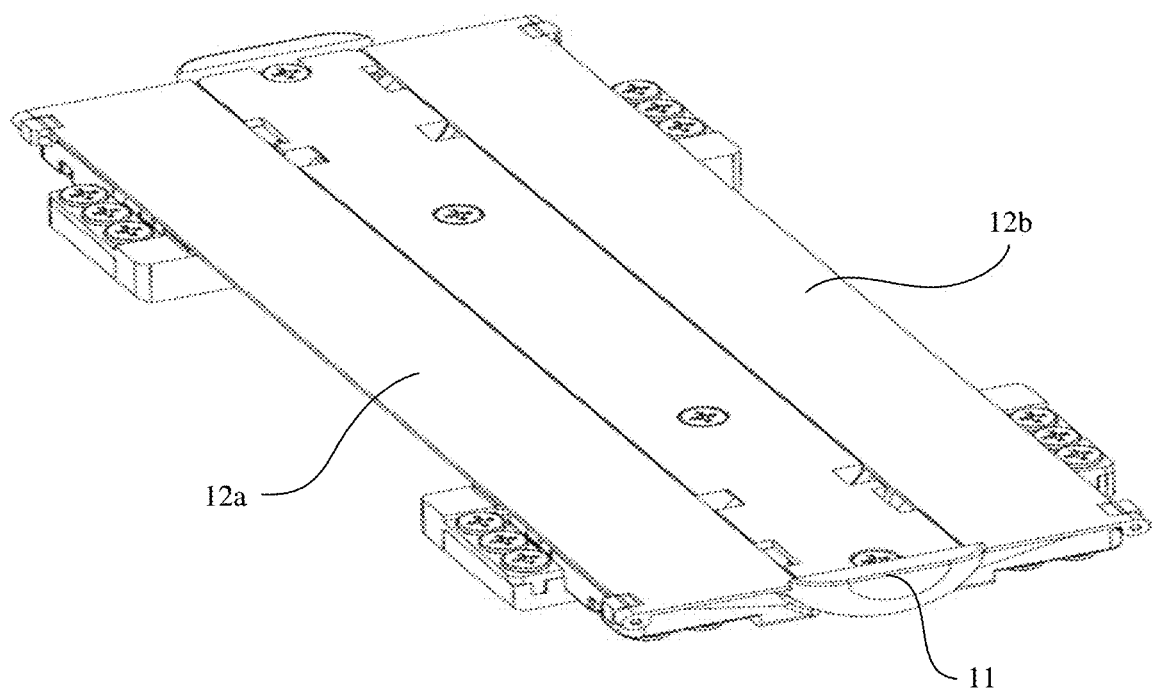
FIG. 4 is a schematic structural diagram of a rotating shaft mechanism according to an embodiment of this disclosure.
Figure 5:
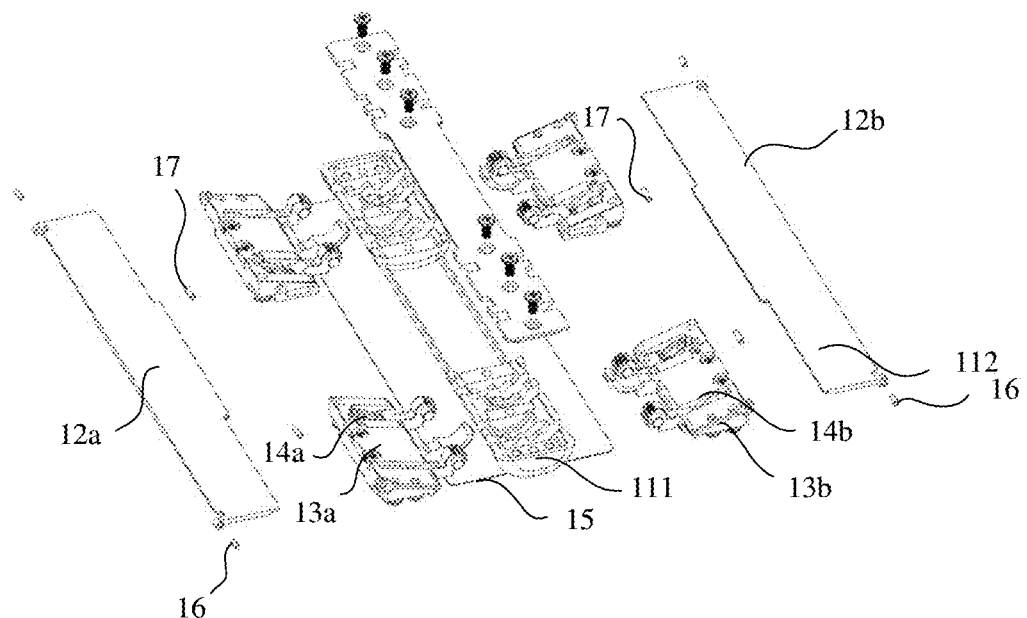
FIG. 5 is a schematic exploded view of a rotating shaft mechanism according to an embodiment of this disclosure.

First, FIG. 4 is a schematic structural diagram of the rotating shaft mechanism 10, and FIG. 5 is a schematic exploded view of the rotating shaft mechanism 10. The rotating shaft mechanism 10 provided in this embodiment of this disclosure mainly includes three parts: a primary shaft component 11, a swing arm component, and a support component. The primary shaft component 11 is a support piece and performs a function of a rotating shaft. The swing arm component is configured to connect the two housings of the mobile terminal, and the support component is configured to form a structure that supports the flexible display 40. In addition, the swing arm component is further used as a connecting piece to connect the support component to the primary shaft component 11. The following describes this disclosure in detail with reference to the specific accompanying drawings.

Still referring to FIG. 4 and FIG. 5, an overall structure of the primary shaft component 11 provided in this embodiment of this disclosure is a semi-cylinder, and a side surface of the primary shaft component 11 includes a first surface and a second surface connected to the first surface. The first surface is a plane and is used to support the flexible display 40, and the second surface is an arc-shaped cylinder. For ease of description, a length direction of the primary shaft component 11 is defined. As shown in FIG. 2 and FIG. 3, the length direction of the primary shaft component 11 refers to a direction of an axis around which the left housing 20 and the right housing 30 rotate.

When the primary shaft component 11 is specifically disposed, the primary shaft component 11 may use different structures. As shown in FIG. 5, the primary shaft component 11 includes two parts: a primary inner shaft 112 and a primary outer shaft 111, and the primary inner shaft 112 is fixedly connected to the primary outer shaft 111. Referring to both FIG. 4 and FIG. 5, the primary inner shaft 112 is fixedly connected to the primary outer shaft 111 in a detachable manner by using a screw. Certainly, in addition to the connection manner shown in FIG. 4, the primary inner shaft 112 may be fastened to the primary outer shaft 111 by using a buckle or a rivet. When the primary inner shaft 112 and the primary outer shaft 111 are specifically disposed, the first surface is a surface of the primary inner shaft 112, and the second surface is a surface of the primary outer shaft 111. Certainly, it should be understood that a split structure used by the primary shaft component 11 is only a specific example. The primary shaft component ni provided in this embodiment of this disclosure may alternatively use another structure. In addition, when the primary shaft component 11 supports the swing arm component, a structure corresponding to the swing arm component is disposed on the primary shaft component 11. For ease of understanding an internal structure of the primary shaft component 11, the following describes the structure in the primary shaft component 11 with reference to the swing arm component.

Figure 6:
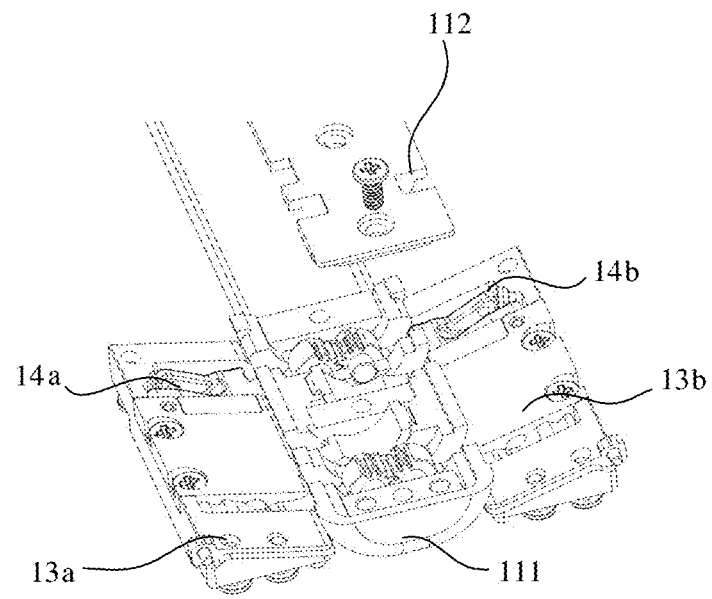
FIG. 6 is a schematic diagram of cooperation between a swing arm component and a primary shaft component according to an embodiment of this disclosure.

Referring to both FIG. 5 and FIG. 6, the swing arm component provided in this embodiment of this disclosure includes two main structures: a connection rod group and a swing arm group. The connection rod group is configured to connect the swing arm group to the primary shaft component 11, and the swing arm group is configured to connect the housing. Quantities of connection rod groups and swing arm groups may be determined according to a requirement, for example, one swing arm group and one connection rod group, or two swing arm groups and two connection rod groups, or two swing arm groups and three connection rod groups. The swing arm group and the connection rod group may be in a one-to-one correspondence, or one swing arm group may correspond to a plurality of connection rod groups. This may be determined during specific disposing according to an actual requirement. As shown in FIG. 5 and FIG. 6, two swing arm groups and two connection rod groups are used in the structures shown in FIG. 5 and FIG. 6, and the swing arm group and the connection rod group are in a one-to-one correspondence. However, it should be understood that in the swing arm component provided in this embodiment of this disclosure, one swing arm group may correspond to two connection rod groups or another correspondence is used.

Figure 7:
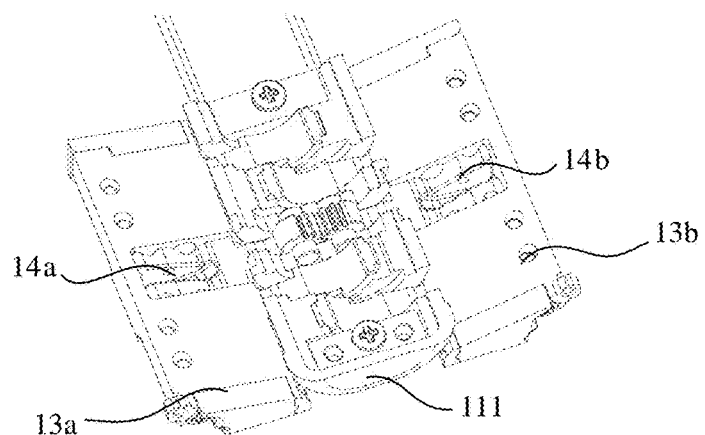
FIG. 7 is a schematic exploded view of a swing arm component and a primary shaft component according to an embodiment of this disclosure.
Figure 8:
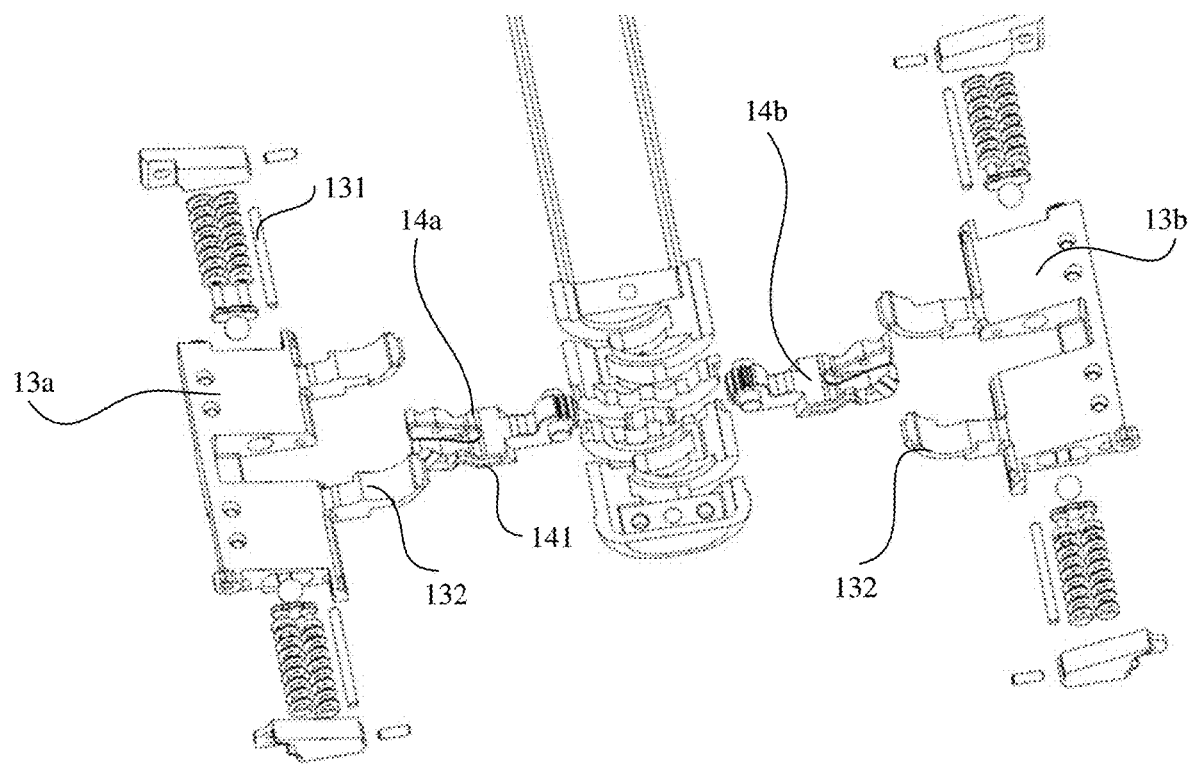
FIG. 8 is a schematic exploded view of a swing arm component and a primary shaft component according to an embodiment of this disclosure.

First, the connection rod group is described. In this disclosure, the connection rod groups have a same structure. FIG. 7 and FIG. 8 show a connection structure between the two connection rod groups in the swing arm component in FIG. 5 and the primary shaft component 11. As can be learned from FIG. 7 and FIG. 8, the two connection rod groups are connected to the primary shaft component 11 in a same manner. Therefore, one connection rod group is used as an example. As shown in FIG. 5, the connection rod group includes two connection rods. For ease of description, the two connection rods are separately named as a left connection rod 14a and a right connection rod 14b. When the left connection rod 14a and the right connection rod 14b are disposed, the two connection rods are correspondingly disposed on the two sides of the primary shaft component 11. As shown in FIG. 8, the left connection rod 14a and the right connection rod 14b are arranged on the two sides of the primary shaft component 11 in the length direction of the primary shaft component 11, and are rotatably connected to the primary shaft component 11. For ease of describing a rotation relationship between the connection rod group and the primary shaft component 11, an example in which the primary shaft component 11 includes the primary outer shaft 111 and the primary inner shaft 112 is used for description. Still referring to FIG. 5 and FIG. 6, the primary outer shaft 111 is an arc-shaped housing, and there is a groove in the arc-shaped housing. When the primary outer shaft 111 is fixedly connected to the primary inner shaft 112, the primary inner shaft 112 covers the groove and encircles to form a cavity 113 shown in FIG. 9. The left connection rod 14a and the right connection rod 14b are separately inserted into the cavity 113. In addition, one end of each of the left connection rod 14a and the right connection rod 14b that is inserted into the cavity 113 is connected to a shaft 143, and the shaft 143 is rotatably connected to the primary shaft component 11. During specific connection, grooves whose cross sections are semicircular are separately designed for the primary inner shaft 112 and the primary outer shaft 111. After being mounted, the primary inner shaft 112 and the primary outer shaft 111 form a hole whose cross section is circular, and the hole whose cross section is circular cooperates with the shaft 143 of the connection rod. Certainly, a round hole may be alternatively provided on the primary inner shaft 112 or the primary outer shaft 111 for the shaft 143 to penetrate through. When the left connection rod 14a and the right connection rod 14b rotate, the left connection rod 14a and the right connection rod 14b may rotate around the shaft 143, to rotate relative to the primary shaft component 11. When the shaft 143 is specifically disposed, referring to both FIG. 8 and FIG. 9, the shaft 143 around which the left connection rod 14a and the right connection rod 14b rotate is parallel to the length direction of the primary shaft component 11. In this case, axes around which the left connection rod 14a and the right connection rod 14b rotate are parallel to the length direction of the primary shaft component 11.

Figure 9:
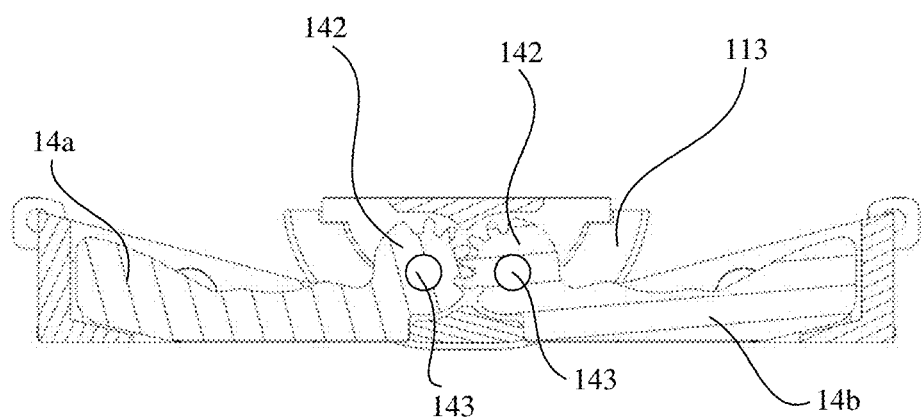
FIG. 9 is a schematic exploded view of a connection rod group and a primary shaft component according to an embodiment of this disclosure.

Still referring to FIG. 7 and FIG. 8, the connection rod is in a strip shape. Referring to FIG. 9, one end of the left connection rod 14a and one end of the right connection rod 14b are located in the primary shaft component 11, and the other end of the left connection rod 14a and the other end of the right connection rod 14b extend outside the primary shaft component 11. In addition, notches cooperating with the left connection rod 14a and the right connection rod 14b are correspondingly disposed on the primary outer shaft 111, so that the left connection rod 14a and the right connection rod 14b have relatively large rotation space. In addition, the end of the left connection rod 14a and the end of the right connection rod 14b that are exposed outside the primary shaft component 11 are configured to slidably connect to the swing arms in the swing arm group. For ease of understanding a connection relationship between the connection rod group and the swing arm group, the following describes a structure of the swing arm group in detail.

First, referring to FIG. 7 and FIG. 8, the swing arm group provided in this embodiment of this disclosure includes two swing arms. For ease of description, the two swing arms are separately named as a left swing arm 13a and a right swing arm 13b, and the left swing arm 13a and the right swing arm 13b are separately configured to fixedly connect to the two housings of the mobile terminal. Referring to both FIG. 2 and FIG. 5, the left swing arm 13a is fixedly connected to the left housing 20, and the right swing arm 13b is fixedly connected to the right housing 30. During specific fixed connection, a bolt or a screw may be used. In this case, the left swing arm 13a and the right swing arm 13b move synchronously with the left housing 20 and the right housing 30 respectively. During specific disposing, the left swing arm 13a and the right swing arm 13b are disposed on the two sides of the primary shaft component 11. More specifically, the left swing arm 13a and the right swing arm 13b are arranged on the two sides of the primary shaft component 11 in the length direction of the primary shaft component 11. The left swing arm 13a and the right swing arm 13b are connected to the connection rod and the primary shaft component 11 in a same manner. Therefore, the left swing arm 13a is used as an example for description.

When the left swing arm 13a is specifically connected to the primary shaft component 11, the left swing arm 13a is rotatably connected to the primary shaft component 11. In addition, an axis around which the left swing arm 13a rotates and an axis around which the corresponding connection rod rotates are different. Although the axes around which rotation is performed are different, both the axis around which the left swing arm 13a rotates and the axis around which the corresponding connection rod rotates are parallel to the length direction of the primary shaft component 11.

Figure 10:
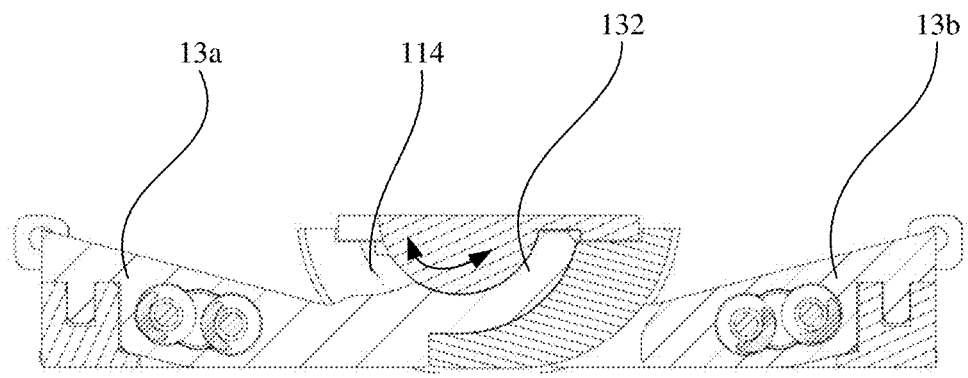
FIG. 10 is a schematic exploded view of a swing arm group and a primary shaft component according to an embodiment of this disclosure.

When the left swing arm 13a is specifically rotatably connected to the primary shaft component 11, FIG. 10 shows a specific structure of rotatable connection between the left swing arm 13a and the primary shaft component 11. During specific disposing, a first arc-shaped chute 114 is disposed in the primary shaft component 11, and the left swing arm 13a is slidably mounted in the first arc-shaped chute 114. When the left swing arm 13a slides relative to the primary shaft component 11, the left swing arm 13a simultaneously rotates relative to the primary shaft component 11. Referring to FIG. 5, when the primary shaft component 11 includes the primary inner shaft 112 and the primary outer shaft 111, an arc-shaped surface is disposed in the primary inner shaft 112, and the arc-shaped surface is a convex arc-shaped surface. In addition, during specific disposing, the arc-shaped surface is opposite to the first surface of the primary inner shaft 112. Correspondingly, a concave arc-shaped groove is provided on the primary outer shaft 111, and the arc-shaped groove and the primary outer shaft 111 are disposed on a surface opposite to the second surface. As shown in FIG. 10, when the primary outer shaft 11 is fixedly connected to the primary inner shaft 112, the arc-shaped surface covers the arc-shaped groove and encircles to form the first arc-shaped chute 114. Certainly, the first arc-shaped chute 114 may also be directly formed on the primary outer shaft 111 or the primary inner shaft 112 by using an integrated structure. In this case, when the first arc-shaped chute 114 is disposed, the first arc-shaped chute 114 may be directly produced on the primary outer shaft 111 or the primary inner shaft 112 when the primary outer shaft 111 or the primary inner shaft 112 is produced. When this production manner is used, precision of the chute can be improved during production, and it is convenient to mount the swing arm. When the left swing arm 13a is slidably mounted in the first arc-shaped chute 114, a first arc-shaped arm 132 configured to be slidably mounted in the corresponding first arc-shaped chute 114 is disposed on the left swing arm 13a, as shown in FIG. 7 and FIG. 8. FIG. 7 and FIG. 8 show that one first arc-shaped arm 132 is disposed on the left swing arm 13a, and one end of the first arc-shaped arm 132 is fixedly connected to one end of the left swing arm 13a. However, it should be understood that in the rotating shaft mechanism 10 provided in this embodiment of this disclosure, a quantity of first arc-shaped arms 132 corresponding to the swing arm is not limited. One first arc-shaped arm 132 may be disposed on one swing arm shown in FIG. 7 and FIG. 8. Alternatively, a plurality of first arc-shaped arms 132 may be disposed on one swing arm, for example, different quantities of two, three, or four first arc-shaped arms.

However, no matter how many first arc-shaped arms 132 are used, the first arc-shaped arms 132 are slidably mounted in the first arc-shaped chute 114. As shown in FIG. 10, the first arc-shaped arm 132 is mounted in the first arc-shaped chute 114, and a radian of the first arc-shaped arm 132 is the same as that of the first arc-shaped chute 114. Therefore, when the left swing arm 13a slides, the left swing arm 13a slides along a length direction of the first arc-shaped chute 114. Because the first arc-shaped chute 114 is an arc-shaped chute, the left swing arm 13a may rotate relative to the primary shaft component 11 during sliding. An arrow shown in FIG. 10 indicates a direction, and the direction is a rotation direction of the left swing arm 13a. As can be learned from FIG. 10, when the left swing arm 13a slides, the left swing arm 13a may slide in an arc-shaped direction defined by the first arc-shaped chute 114, and may rotate relative to the primary shaft component 11 while sliding. When the left swing arm 13a is fixedly connected to the left housing 20, rotation of the left swing arm 13a relative to the primary shaft component 11 may drive the left housing 20 to rotate relative to the primary shaft component 11, to unfold or fold the mobile terminal.

Still referring to FIG. 7 and FIG. 8, when the right swing arm 13b is specifically disposed, a manner of connecting the right swing arm 13b to the primary shaft component 11 is the same as that of connecting the left swing arm 13a to the primary shaft component 11. Therefore, details are not described herein again. However, when the first arc-shaped arm 132 of the right swing arm 13b is specifically disposed, a manner of disposing the first arc-shaped arm 132 may be different from that of disposing the first arc-shaped arm 132 of the left swing arm 13a. As shown in FIG. 7 and FIG. 8, when the left swing arm 13a and the right swing arm 13b are specifically disposed, the first arc-shaped arms 132 of the left swing arm 13a and the right swing arm 13b are staggered. The foregoing location staggering refers to that in an axis direction of the primary shaft component 11, there is a position difference between the first arc-shaped arms 132 correspondingly connected to the two swing arms, and after the first arc-shaped arms 132 are mounted on the primary shaft component 11, the first arc-shaped arm 132 of the left swing arm 13a and the first arc-shaped arm 132 of the right swing arm 13b are arranged in the axis direction of the primary shaft component 11. When this manner is used for disposing, as shown in FIG. 10, the first arc-shaped arm 132 of the left swing arm 13a may be in contact with the primary shaft component 11 to a relatively large extent, that is, a length by which the first arc-shaped arm 132 extends into the first arc-shaped chute 114 is relatively long. The left swing arm 13a shown in FIG. 10 is used as an example. When the mobile terminal is folded, the left swing arm 13a rotates by 90 degrees relative to the primary shaft component 11, and therefore drives the first arc-shaped arm 132 to accordingly rotate by 90 degrees. However, as shown in FIG. 10, a length of contact between the first arc-shaped arm 132 and the primary shaft component 11 is obviously greater than 90 degrees. Therefore, it is ensured that the first arc-shaped arm 132 does not slide out of the first arc-shaped chute 114 in the folded state, thereby improving stability of sliding connection between the entire swing arm and the primary shaft component 11. Certainly, when the rotating shaft mechanism 10 uses a plurality of swing arm groups, the foregoing disposing manner may be used. In this case, the first arc-shaped arms 132 on the two swing arms correspondingly provided in each swing arm group are disposed in the staggered manner. In addition, FIG. 10 shows only a specific implementation solution. In the swing arm group provided in this embodiment of this disclosure, the first arc-shaped arms 132 of the two swing arms may be also symmetrically disposed. In this case, the first arc-shaped arms 132 on the left swing arm 13a and the right swing arm 13b are symmetrically disposed.

Because the axis around which the connection rod rotates and the axis around which the swing arm rotates are different, when the swing arm and the left connection rod rotate relative to the primary shaft component 11, the swing arm and the connection rod slide and rotate relative to each other. Therefore, when the swing arm is connected to the connection rod, the swing arm is slidably connected to the corresponding connection rod, and the connection rod and the swing arm can rotate relative to each other. FIG. 6 and FIG. 7 show specific manners of connecting the swing arm and the connection rod. When the swing arm in the swing arm group is connected to the connection rod in the connection rod group, the two swing arms in the swing arm group are connected to the corresponding connection rods in a same manner. Therefore, the left swing arm 13a and the left connection rod 14a are used as an example for description.

FIG. 7 and FIG. 8 are separately schematic exploded views of the left swing arm 13a in a different swing arm group and the left connection rod 14a. When the left swing arm 13a is specifically mounted to the left connection rod 14a, a pin shaft 131 is disposed on the left swing arm 13a, and correspondingly, a first chute 141 is disposed on the left connection rod 14a. During slidable mounting, slidable connection between the left swing arm 13a and the left connection rod 14a is implemented by sliding the pin shaft 131 in the first chute 141, as shown in a structure in FIG. 8. When the pin shaft 131 slides, the pin shaft 131 may rotate relative to the first chute 141, to implement rotation of the left swing arm 13a and the left connection rod 14a during relative sliding. Certainly, FIG. 8 shows only a specific connection manner. Alternatively, the first chute may be disposed on the left swing arm 13a, and correspondingly, a first protrusion is disposed on the left connection rod 14a. A cooperation principle thereof is the same as that of the foregoing, and details are not described herein again. In addition, to avoid interference between the left swing arm 13a and the left connection rod 14a during rotation relative to the primary shaft component 11, a notch (not marked in the figure) is disposed on the left swing arm 13a when the left swing arm 13a is disposed. When the left connection rod 14a is connected to the left swing arm 13a, the left connection rod 14a is at least partially located in the notch of the left swing arm 13a, and the first chute 141 on the left connection rod 14a is also located in the notch. In this case, the pin shaft penetrating through the left swing arm 13a passes through the first chute 141. Specifically, the notch may be formed when the left swing arm 13a is formed. For example, when the left swing arm 13a uses an integrated structure, a notch may be directly produced on the left swing arm 13a. The notch may be formed when the left swing arm 13a is directly produced, or a notch may be opened with a tool after the left swing arm 13a is produced. Certainly, the swing arm may be alternatively a component structure. As shown in FIG. 7, the swing arm includes two parts of structures: a first portion and a second portion. The first portion is connected to the first arc-shaped arm 132 and the first portion is in a strip shape, and the second portion is in a shape of 7. During connection, the first portion is connected to a horizontal part of the second portion, so that a notch is formed between the first portion and a vertical part of the second portion.

In the foregoing embodiment, a manner of connecting the right swing arm 13b and the right connection rod 14b is the same as that of connecting the left swing arm 13a and the left connection rod 14a. Therefore, details are not described herein again. When the axes around which the swing arm and the corresponding connection rod rotate are specifically disposed, the two swing arms in each swing arm group may be rotatably connected to the primary shaft component around a same axis or around different axes. Axes around which two connection rods in each connection rod group rotate are symmetrically disposed on two sides of an axis around which two swing arms in a corresponding swing arm group rotate. Refer to both FIG. 9 and FIG. 10. As shown in FIG. 10, when the axis around which the swing arm rotates is specifically disposed, the axis around which the swing arm rotates is a virtual axis and is located outside the first surface. Referring to FIG. 9, the shaft 143 around which the connection rod rotates shown in FIG. 9 is located in the primary shaft component 11. Therefore, a shaft around which the swing arm rotates is located above the shaft around which the connection rod rotates. In addition, the shafts 143 corresponding to the two connection rods are symmetrically located on two sides of the axis around which the swing arm rotates.

When the swing arm group cooperates with the connection rod group, a notch that is in a one-to-one correspondence with a corresponding connection rod is provided on each swing arm, and the connection rod is at least partially located in the corresponding notch. When the first chute 131 is disposed, the first chute 131 is disposed on two sides of the notch of each corresponding swing arm. A first protrusion 141 slidably mounted in the first chute 131 is disposed on a corresponding connection rod, to implement slidable connection between the swing arm and the corresponding connection rod.

When the connection rod slides relative to the swing arm, a sliding direction of the connection rod is in a length direction of the corresponding swing arm (the swing arm is perpendicular to a direction of the axis around which the swing arm rotates). In addition, when the swing arms on the two sides of the primary shaft component 11 rotate toward each other to the first position, the two swing arms are close to each other and the mobile terminal is in a folded state. The corresponding connection rod slides to a position close to the axis around which the swing arm rotates. However, when the swing arms on the two sides of the primary shaft component 11 rotate toward each other to an unfolded state, the two swing arms are arranged on the two sides of the primary shaft component 11, and the connection rod slides, relative to a corresponding swing arm, to an end that is of the swing arm and that is away from the primary shaft component 11. As can be learned from the foregoing descriptions, when the mobile terminal rotates from the unfolded state to the folded state, when sliding relative to a corresponding swing arm, the connection rod slides from a side that is of the swing arm and that is away from the primary shaft component 11 to a side that is of the swing arm and that is close to the primary shaft component 11. When the mobile terminal rotates from the folded state to the unfolded state, when sliding relative to the corresponding swing arm, the connection rod slides from the side that is of the swing arm and that is close to the primary shaft component 11 to the side that is of the swing arm and that is far away from the primary shaft component 11.

Figure 11:
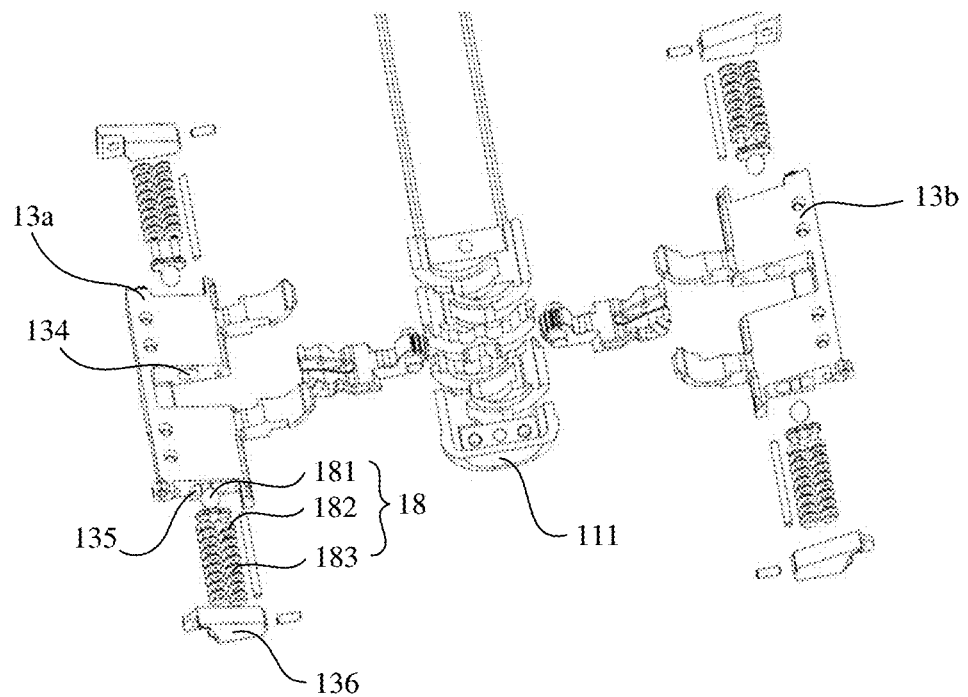
FIG. 11 is a schematic exploded view of a position limiting mechanism according to an embodiment of this disclosure.
Figure 12:
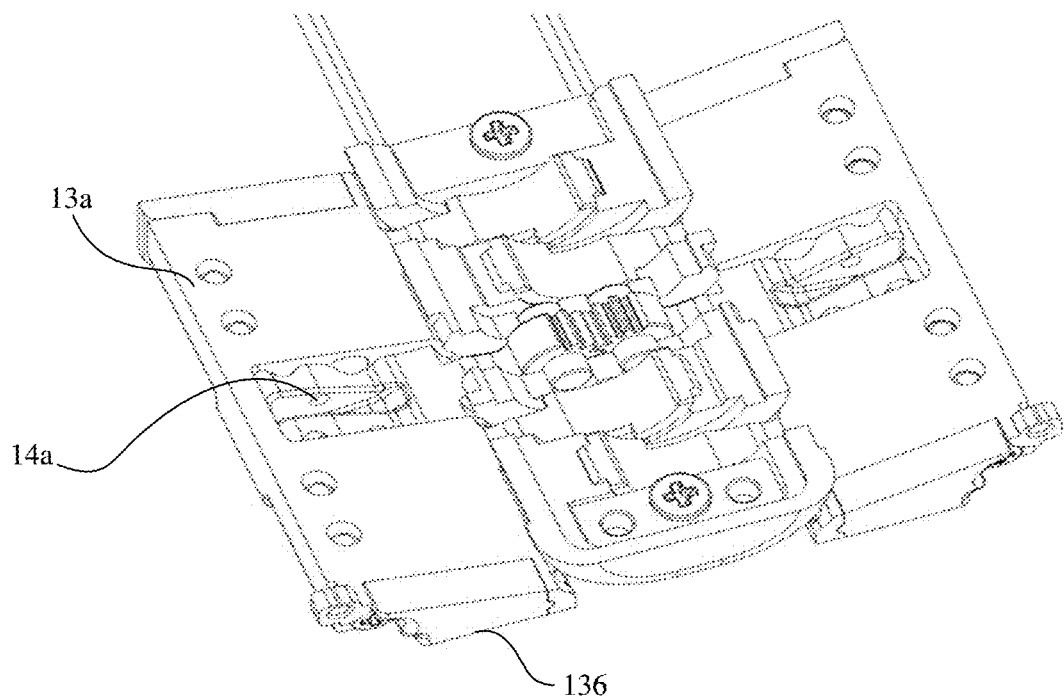
FIG. 12 is a schematic structural diagram of cooperation between a position limiting mechanism and a swing arm according to an embodiment of this disclosure.

It should be understood that, although each swing arm corresponds to one connection rod in FIG. 7 and FIG. 8, in the rotating shaft mechanism 10 provided in this embodiment of this disclosure, quantities of swing arms and corresponding connection rods are not limited. For example, each swing arm corresponds to different quantities of connection rods such as two, three, and four. As shown in FIG. 11 and FIG. 12, each swing arm corresponds to two connection rods. Therefore, in this embodiment of this disclosure, provided that each swing arm is slidably connected to at least one connection rod located on a same side, all quantities may be applied to the embodiments of this disclosure.

In addition, when the swing arm component is used, when the left housing 20 and the right housing 30 rotate relative to each other, the left connection rod 14a and the right connection rod 14b are driven to rotate relative to each other. To ensure synchronization between the left housing 20 and the right housing 30, still referring to FIG. 7 and FIG. 9, a gear 142 is disposed at each of opposite ends of two connection rods in each connection rod group, that is, the gear 142 is disposed at each of opposite ends of the left connection rod 14a and the right connection rod 14b. As shown in FIG. 9, the gear 142 is disposed at an end of the left connection rod 14a and an end of the right connection rod 14b that are located in the cavity 113, and the two gears 142 mesh with each other when the left connection rod 14a and the right connection rod 14b are mounted. When an end of the left connection rod 14a and an end of the right connection rod 14b are located in the cavity 113 of the primary shaft component 11, the two gears 142 are located in the cavity 113. In addition, shafts around which the left connection rod 14a and the right connection rod 14b rotate relative to the primary shaft component 11 separately penetrate through the two gears 142. When the left connection rod 14a or the right connection rod 14b rotates, the meshed gears 142 drive the other connection rod to rotate, thereby implementing synchronous rotation of the left connection rod 14a and the right connection rod 14b. Further, the left connection rod 14a and the right connection rod 14b drive, by using the swing arm group, the two housings to be unfolded and folded synchronously.

When the mobile terminal is used, the mobile terminal needs to be stable in a specific state, for example, in the folded state or the unfolded state. Therefore, when the rotating shaft mechanism is disposed, a position limiting mechanism is disposed for relative rotation of the left housing and the right housing. If relative sliding positions of the swing arm and the connection rod are limited, the position limiting mechanism may further limit relative positions of the left housing and the right housing of the mobile terminal by limiting the relative sliding positions of the swing arm and the connection rod. Alternatively, a relative position at which the swing arm rotates relative to the primary shaft component may be limited, that is, a position at which the left swing arm and the right swing arm rotate relative to each other is limited, to further limit a relative position relationship between the left housing and the right housing. When the position limiting mechanism is specifically disposed, different structures may be used, and are described below with reference to the accompanying drawings.

When the position limiting mechanism is specifically disposed, the position limiting mechanism includes an elastic component slidably mounted on the swing arm, and at least two buckle openings that are disposed on the connection rod and that are configured to buckle with the elastic component. As shown in FIG. 11 and FIG. 12, the left swing arm 13a is used as an example. The left swing arm 13a corresponds to one left connection rod 14a, and the elastic component includes a sphere 181 and an elastic piece that pushes the sphere 181 to buckle with the buckle opening. As shown in FIG. 12, the elastic piece (for example, a spring 183 or an elastic rubber) and the sphere 181 are mounted in the left swing arm 13*a*. A spring cylindrical guiding hole 135 and a spherical guiding hole 134 are designed on the left swing arm 13*a*. One, two, or more spring cylindrical guiding holes 135 may be designed during specific disposing, and a quantity of spring cylindrical guiding holes 135 depends on a quantity of springs 183. In addition, a spring guiding rod 182 further penetrates through the spring 183, and a compression rate of the spring 183 may be limited by the spring guiding rod 182. The sphere 181, the spring guiding rod 182, and the spring 183 are sequentially mounted in the left swing arm 13*a*. When the connection rod corresponds to the position limiting mechanism, one position limiting mechanism may be used to correspond to the connection rod, or two position limiting mechanisms may be used to correspond to the connection rod. In the structures shown in FIG. 11 and FIG. 12, each connection rod corresponds to two position limiting mechanisms, and the two position limiting mechanisms are located on two sides of the notch of the left swing arm 13*a*. To be specific, when the spring cylindrical guiding hole 135 is disposed, the spring cylindrical guiding hole 135 is correspondingly disposed on each of two opposite side walls of the notch of the left swing arm 13*a*. One end that is of the spring cylindrical guiding hole 135 and that faces the connection rod is connected to the spherical guiding hole 134, and the other end of the spring cylindrical guiding hole 135 is opened on the left swing arm 13*a*. During mounting, the sphere 181 and the spring 183 are sequentially mounted in the spring cylindrical guiding hole 135, and a part of the sphere 181 is exposed in the notch. In addition, the other end of the spring cylindrical guiding hole 135 is blocked by disposing a stopper 136. In this case, two ends of the spring 183 separately press against the sphere 181 and the stopper 136. Correspondingly, corresponding buckle openings are also separately disposed on two sides of the left connection rod 14*a*, and relative sliding between the left connection rod 14*a* and the left swing arm 13*a* may be limited by cooperation between the sphere 181 and the buckle opening. When the left connection rod 14*a* rotates and slides relative to the left swing arm 13*a*, the sphere 181 in the left swing arm 13*a* slides relative to and rubs against the buckle opening of the left connection rod 14*a* under action of the spring 183, to form a cam damping structure and provide a damping effect to rotation of the rotating shaft.

Figure 13:
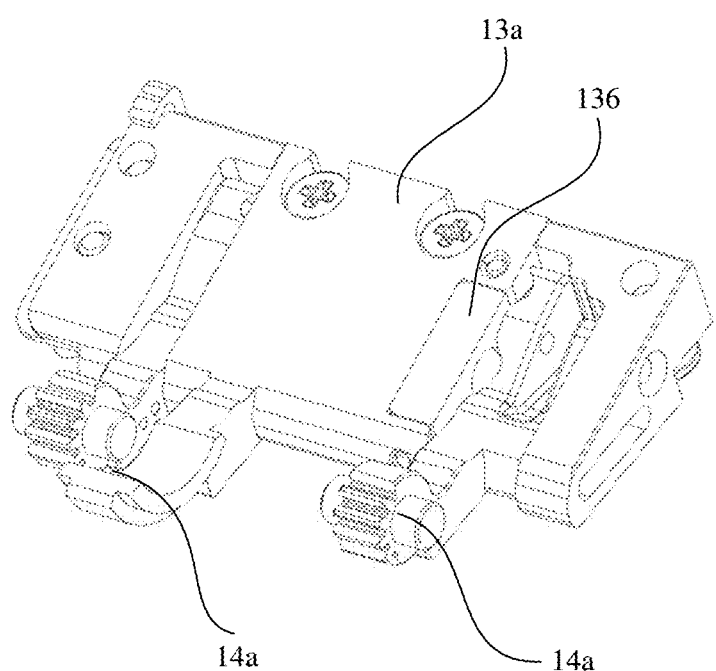
FIG. 13 is a schematic structural diagram of another position limiting mechanism according to an embodiment of this disclosure.
Figure 14:
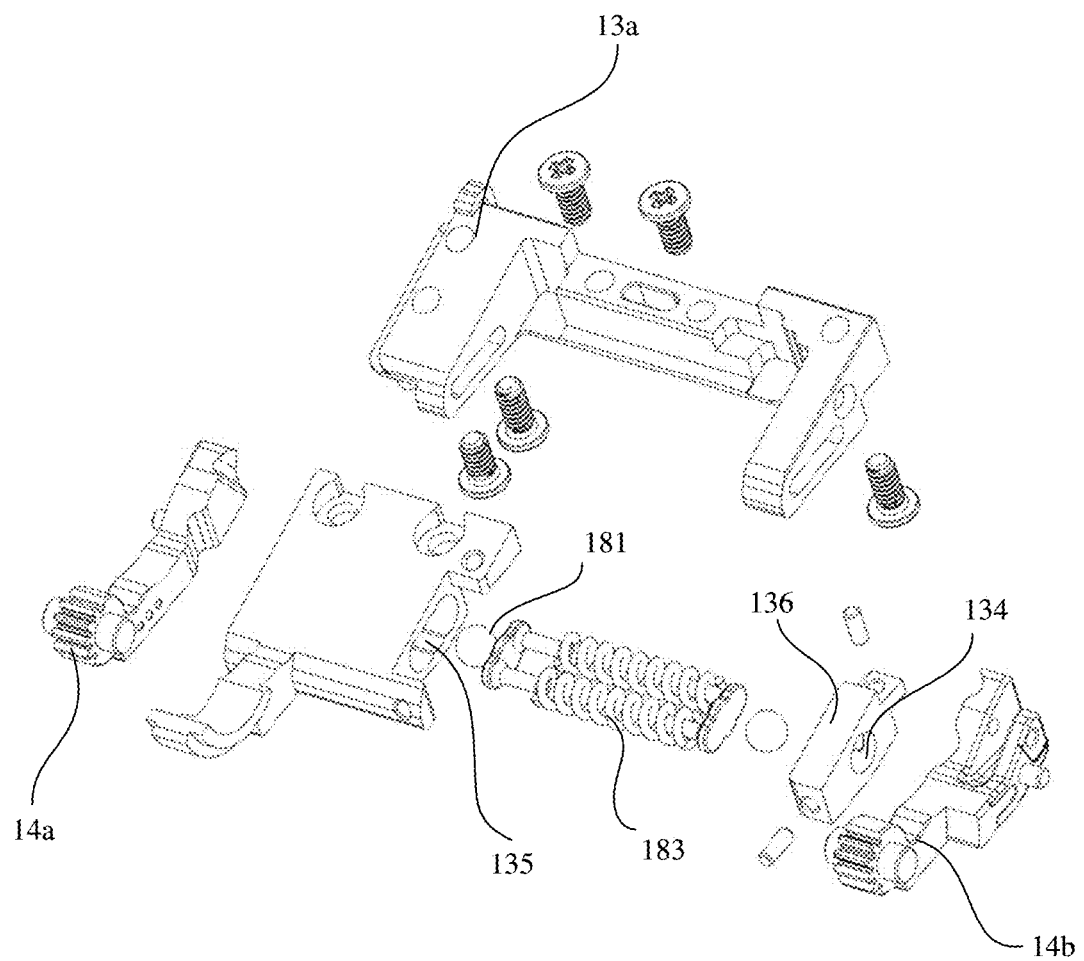
FIG. 14 is a schematic diagram of mounting another position limiting mechanism according to an embodiment of this disclosure.

Specifically, when the left swing arm 13*a* corresponds to the left connection rod 14*a*, there may be different correspondences. For example, one left swing arm 13*a* corresponds to one left connection rod 14*a* or two or more left connection rods 14*a*. When one left swing arm 13*a* is slidably connected to at least two left connection rods 14*a*, referring to FIG. 13 and FIG. 14, buckle openings on two adjacent connection rods are disposed opposite to each other, a through hole is disposed on the swing arm, the sphere 181 corresponding to each buckle opening is slidably mounted in the through hole, an elastic piece is disposed between the two spheres 181, and two ends of the elastic piece are separately in pressing contact with the two spheres 181. The left swing arm 13*a* is used as an example. The elastic piece (for example, the spring 183 or an elastic rubber) and the sphere 181 are mounted in a position between two left connecting pieces in the left swing arm 13*a*. Specifically, the spring cylindrical guiding hole 135 and the spherical guiding hole 134 are designed in the middle of the left swing arm 13*a*. There may be two spherical guiding holes 134 or one spherical guiding hole 134, and there is one spring cylindrical guiding hole 135. During mounting, one end that is of the spring cylindrical guiding hole 135 and that faces one of the left connection rods 14*a* is connected to one spherical guiding hole 134, and the other end of the spring cylindrical guiding hole 135 is opened on the left swing arm 13*a*. During mounting, after one sphere 181 and the spring 183 are sequentially mounted in the spring cylindrical guiding hole 135, another sphere 181 is mounted, and a part of the sphere 181 is exposed in the notch. Then, the other end of the spring cylindrical guiding hole 135 is blocked by disposing the stopper 136, and another spherical guiding hole 134 is disposed on the stopper 136. Therefore, after the stopper 136 is fastened, another sphere 181 may be exposed in the notch by using the spherical guiding hole 134 disposed on the stopper 136. In this case, two ends of the spring 183 separately press against the two spheres 181. Correspondingly, corresponding buckle openings are also separately disposed on opposite sides of the two left connection rods 14*a*, and relative sliding between the left connection rod 14*a* and the left swing arm 13*a* may be limited by cooperation between the sphere 181 and the buckle opening. When the left connection rod 14*a* rotates and slides relative to the left swing arm 13*a*, the sphere 181 in the left swing arm 13*a* slides relative to and rubs against the buckle opening of the left connection rod 14*a* under action of the spring 183, to form the cam damping structure and provide the damping effect to rotation of the rotating shaft.

It should be understood that the position limiting mechanism corresponding to the right swing arm is the same as that corresponding to the left swing arm 13*a*. Therefore, details are not described herein again.

A position limiting mechanism 18 may further limit a position of the housing of the mobile terminal by limiting rotation of the swing arm. Referring to the structures shown in FIG. 7 and FIG. 8, when the staggered first arc-shaped arms 132 are used between the left swing arm 13*a* and the right swing arm 13*b*, there are two opposite surfaces between the two first arc-shaped arms 132 when the left swing arm 13*a* and the right swing arm 13*b* rotate. An elastic protrusion and a card slot may be separately disposed on the two surfaces. Cooperation between the elastic protrusion and the card slot that are disposed can limit rotation positions of the two swing arms, and a locking function may also be implemented. It should be understood that cooperation between the elastic protrusion and the card slot is implemented in a common clamping manner in this field. Therefore, a structure thereof is not described in detail again.

As can be learned from the foregoing descriptions, cooperation between the elastic component and the buckle opening limits relative sliding positions of the swing arm and the connection rod. In addition, a damping function is further provided between the elastic component and the buckle opening. In this way, a damping force of the mobile terminal can be increased in a folding process, and an adjustable damping force or better folding operation experience is provided.

Referring to both FIG. 2 and FIG. 4, when the rotating shaft mechanism 10 supports the flexible display 40, the support component is used to support the flexible display 40, to improve a supporting effect of the flexible display 40. When the support component is specifically disposed, refer to FIG. 5. The support component includes two support plates, and the two support plates are correspondingly disposed on the two sides of the primary shaft component 11, that is, the two support plates are disposed on the two sides of the primary shaft component 11 along the length direction of the primary shaft component 11. As shown in FIG. 4, when the primary shaft component 11 has the first surface and the second surface opposite to the first surface, the first surface is a surface used to support the flexible display 40, and the support plate also has a surface used to support the flexible display 40. When the support plate rotates to a specific position, as shown in FIG. 2, the rotating shaft mechanism unfolds and can support the flexible display. In this case, the first surface is approximately flush to the surface that is on the support plate and that is used to support the flexible display 40, so that the flexible display 40 can be smoothly supported. Being approximately flush above means that the first surface is flush to the surface that is on the support plate and that supports the flexible display 40, or there is a specific error between the first surface and the surface that is on the support plate and that supports the flexible display 40. The first surface is disposed to be flush to the surface that is on the support plate and that supports the flexible display 40, to improve the supporting effect of the flexible display 40.

When the two support plates are specifically disposed, for ease of description, the support plates are classified into a left support plate 12a and a right support plate 12b. The left support plate 12a is correspondingly connected to the left swing arm 13a and the left connection rod 14a on the left side, and the right support plate 12b is connected to the corresponding right swing arm 13b and the corresponding right connection rod 14b. However, during specific connection, different manners may be used in disposing, and are separately described below with reference to the accompanying drawings.

Figure 15:
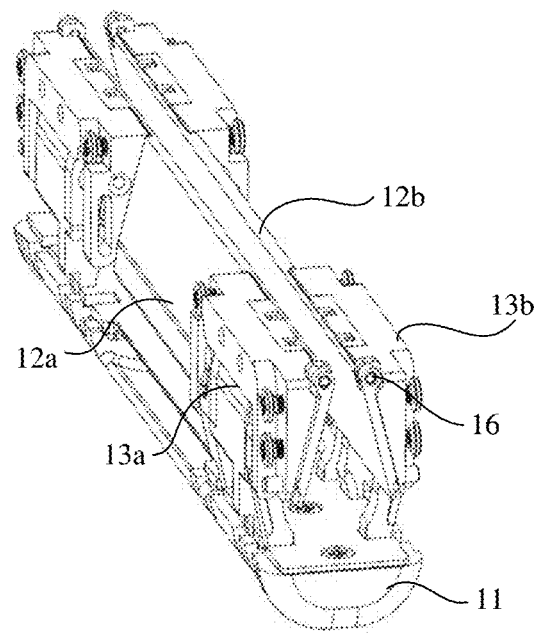
FIG. 15 is a schematic diagram of cooperation between a support component and a swing arm component according to an embodiment of this disclosure.
Figure 16:
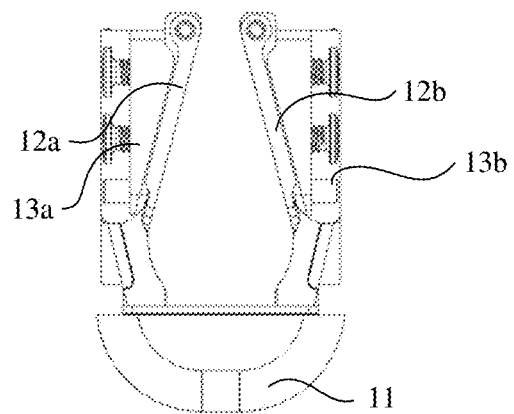
FIG. 16 is a schematic diagram of end faces of a support component and a swing arm component according to an embodiment of this disclosure.
Figure 17A:
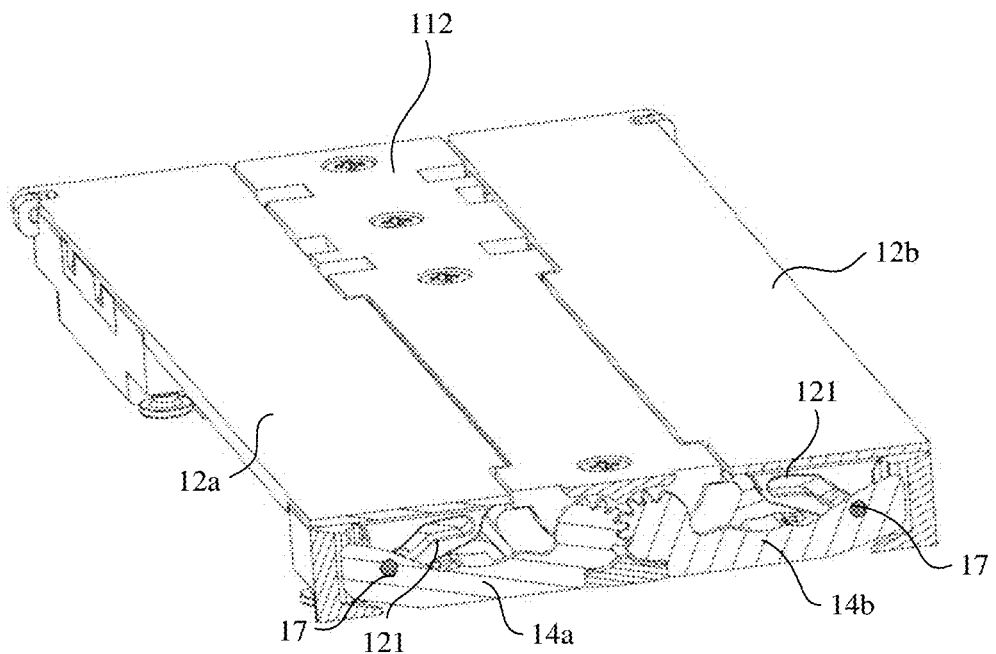
FIG. 17a and FIG. 17b are schematic diagrams of cooperation between a support plate and a swing arm when the support plate and the swing arm are unfolded according to an embodiment of this disclosure.

FIG. 15 and FIG. 16 show specific connection manners. In structures shown in FIG. 15 and FIG. 16, a connection manner of the left support plate 12a is the same as that of the right support plate 12b. Therefore, the left support plate 12a is used as an example for description. As shown in FIG. 15 and FIG. 16, the left support plate 12a is rotatably connected to the left swing arm 13a. During specific connection, the left support plate 12a is rotatably connected to the left swing arm 13a by using a pin shaft 16. Referring to FIG. 5, two ends of a left side (where a disposing direction of the left support plate 12a in FIG. 5 is used as a reference direction) of the left support plate 12a are separately rotatably connected to the two left swing arms 13a by using the pin shaft 16. In addition, the left support plate 12a is slidably connected to the left connection rod 14a, and the left support plate 12a may rotate relative to the left connection rod 14a. FIG. 17a shows a specific manner of connecting the left support plate 12a to the left connection rod 14a. A second chute 121 is disposed on the left support plate 12a, correspondingly, a pin shaft 17 penetrates through the left connection rod 14a, and the pin shaft 17 is slidably mounted in the second chute 121. When the left support plate 12a and the left connection rod 14a slide relative to each other, because the left connection rod 14a and the left swing arm 13a rotate relative to each other, the left support plate 12a is also driven to rotate relative to the left connection rod 14a. It should be understood that cooperation between the second chute 121 and the pin shaft 17 is only an example. Alternatively, the second chute may be disposed on the left connection rod 14a, and correspondingly, a second protrusion that is slidably mounted in the second chute is disposed on the left support plate.

Figure 17B:
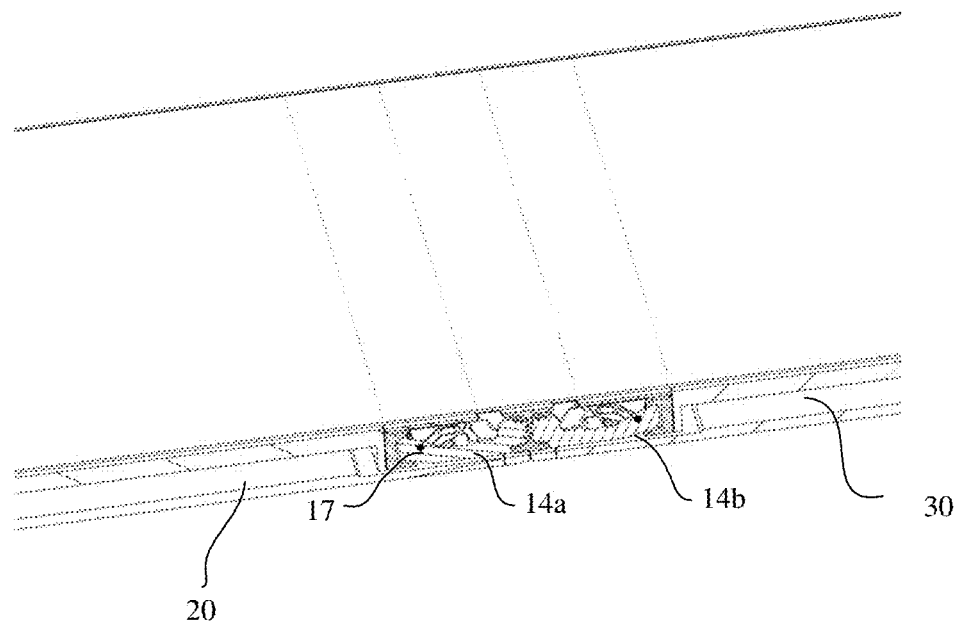
Figure 18:
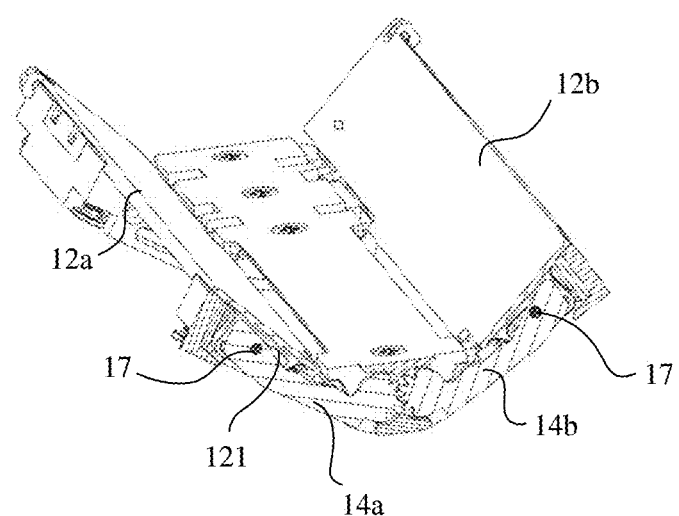
FIG. 18 is a schematic diagram of cooperation between a support plate and a swing arm during rotation according to an embodiment of this disclosure.
Figure 19A:
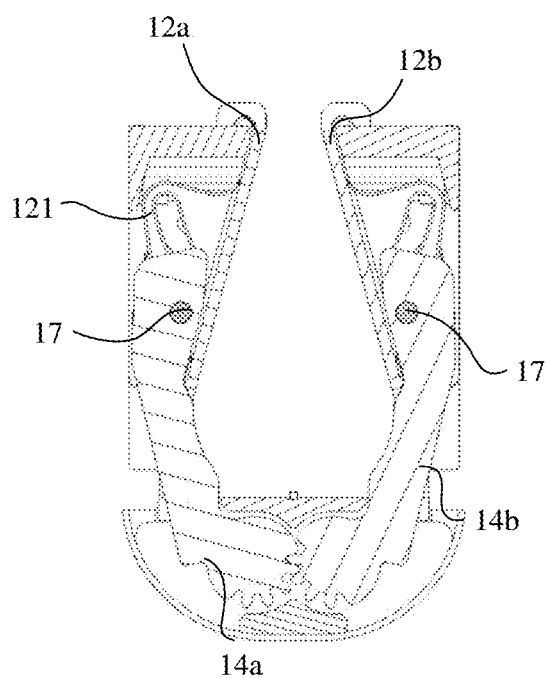
FIG. 19a and FIG. 19b are schematic diagrams of cooperation between a support plate and a swing arm during folding according to an embodiment of this disclosure.
Figure 19B:
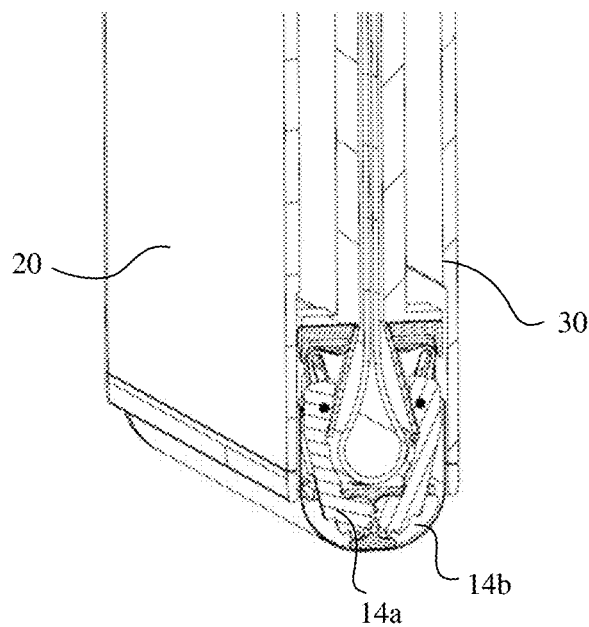

For ease of understanding a rotation manner of the left support plate 12a, the following describes the rotation manner with reference to specific accompanying drawings. First, FIG. 17a and FIG. 17b separately show states of the support plate, the swing arm, and the connection rod of the rotating shaft mechanism 10 when the mobile terminal is in the unfolded state. In a structure shown in FIG. 17a, the left support plate 12a is flush to the first surface, and the pin shaft 17 on the left connection rod 14a is located on the left side of the second chute 121. In this case, as shown in FIG. 17b, the left housing 20, the rotating shaft mechanism 10, and the right housing 30 are sequentially unfolded, and the flexible display 40 covering the left housing 20, the rotating shaft mechanism 10, and the right housing 30 are unfolded. When folding needs to be performed, FIG. 18 shows a state when the rotating shaft mechanism 10 rotates to a specific angle. In this case, it can be seen that the left connection rod 14a and the left swing arm 13a rotate relative to the primary shaft component 11. In addition, because the left swing arm 13a and the left connection rod 14a rotate around different axes, the left connection rod 14a and the left swing arm 13a slide and rotate relative to each other. In addition, the pin shaft 17 slides to a middle position of the second chute 121, and the pin shaft 17 drives the left support plate 12a to rotate towards the left swing arm 13a. When the left housing 20 and the right housing 30 are completely folded (that is, the mobile terminal is in the folded state), as shown in FIG. 19a and FIG. 19b, the pin shaft 17 is located at the rightmost end of the second chute 121, and driven by the pin shaft 17, the left support plate 12a and the left swing arm 13a are close to each other, or there is a relatively small gap between the left support plate 12a and the left swing arm 13a. In this case, the swing arms on the two sides of the primary shaft component 11 rotate toward each other to the first position, correspondingly, the connection rod and the swing arm drive the two support plates to rotate toward each other to the second position, and the support plates and the primary shaft component encircle to form folded space that accommodates the flexible display of the mobile terminal. Specifically, as shown in FIG. 19a, the support plate and the primary inner shaft 112 encircle to form space similar to a triangle. Referring to FIG. 19b, when the flexible display 40 is folded, a folded area of the flexible display 40 forms a bend similar to a water droplet shape.

When the right support plate 12b is disposed, a connection manner of the right support plate 12b is the same as that of the left support plate 12a. Therefore, details are not described herein again.

As can be learned from the foregoing descriptions, the left connection rod 14a and the right connection rod 14b provided in the connection rod group drive the left support plate 12a and the right support plate 12b to move. Because the axis around which the connection rod rotates and the axis around which the swing arm rotates are different, the first protrusion 141 is designed on the connection rod and the first chute 131 is designed on the swing arm. When the rotating shaft mechanism 10 is folded and rotated, the first chute 131 on the swing arm drives the first protrusion 141 on the connection rod to drive the connection rod to rotate, and meshing between the gears 142 implements synchronization. In addition, in a folding process, a phase difference generated when the connection rod and the swing arm eccentrically rotate is used, and the second protrusion on the connection rod drives the support plate to rotate and move, to smoothly support the screen in the unfolded state and provide sufficient accommodation space for the screen in the folded state.

Still referring to FIG. 19a and FIG. 19b, when the rotating shaft mechanism 10 is folded, the left swing arm 13a and the right swing arm 13b rotate relative to the primary shaft component 11 when the rotating shaft mechanism 10 rotates.

In addition, when the left swing arm 13a and the right swing arm 13b rotate, the left support plate 12a and the right support plate 12b are driven to rotate and move. After complete folding, the left support plate 12a and the right support plate 12b rotate relative to the left swing arm 13a and the right swing arm 13b to avoid a concave space. The concave space can accommodate the screen during complete folding. In addition, in an entire folding process, it can be ensured that a non-bonding area of the flexible display 40 has sufficient space for curving inward without a bulge. In addition, after complete folding, there is no large gap between the left housing 20 and the right housing 30 on the two sides, and the left housing 20 and the right housing 30 may be completely closed, to achieve an equal thickness of the entire system in the folded state.

Figure 20:
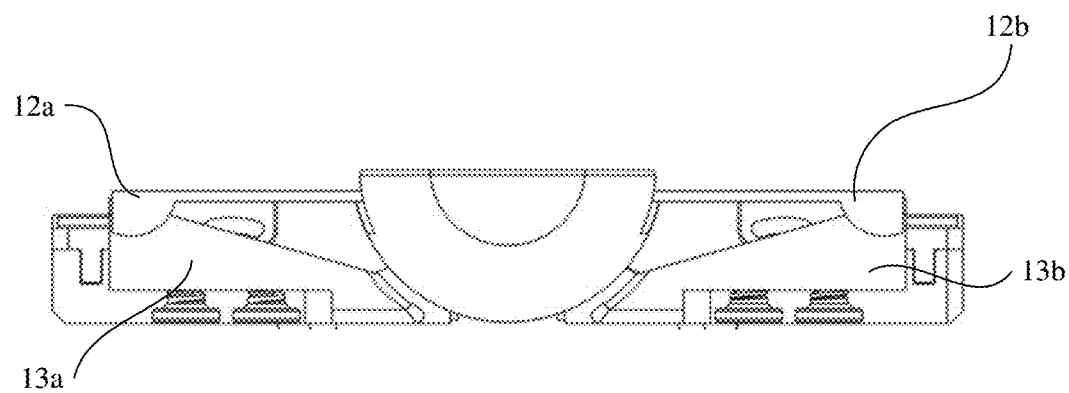
FIG. 20 is another schematic diagram of cooperation between a support plate and a swing arm according to an embodiment of this disclosure.
Figure 21:
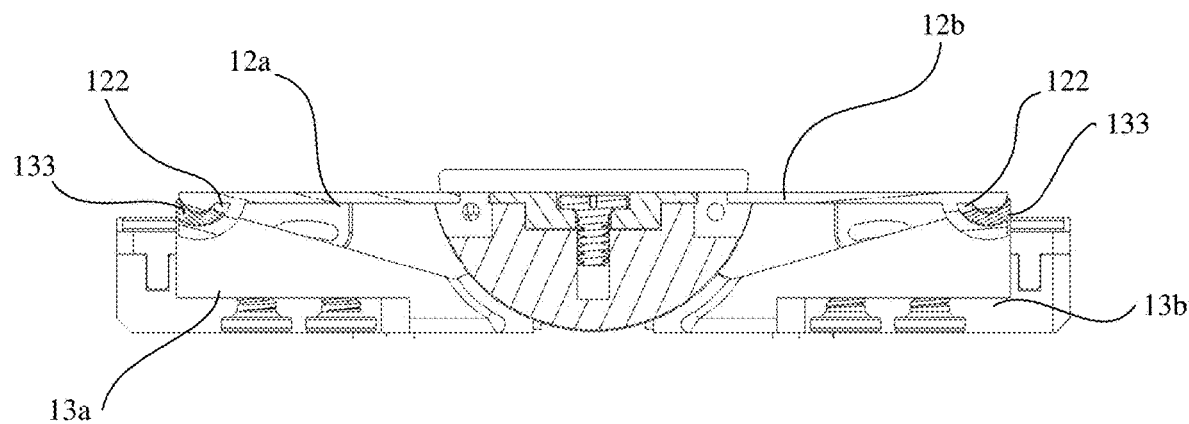
FIG. 21 is a schematic diagram of cooperation between a support plate and a swing arm when the support plate and the swing arm are unfolded according to an embodiment of this disclosure.
Figure 22:
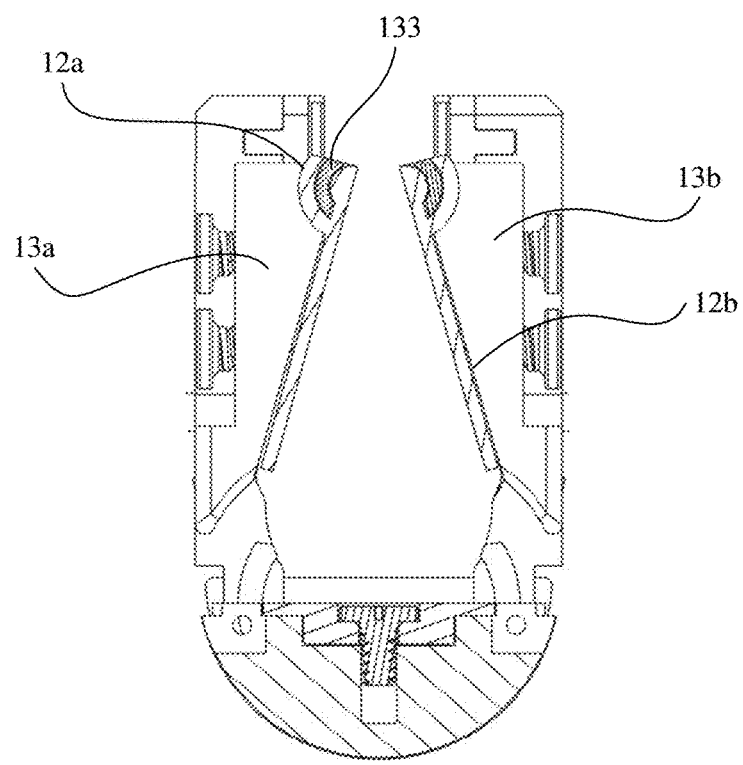
FIG. 22 is a schematic diagram of cooperation between a support plate and a swing arm when the support plate and the swing arm are folded according to an embodiment of this disclosure.

When the support plate is rotatably connected to the corresponding swing arm, another manner may be used in addition to the pin shaft 16. For example, a second arc-shaped chute 122 is disposed on each support plate. A second arc-shaped arm 133 that is slidably mounted in the second arc-shaped chute 122 is disposed on the swing arm corresponding to each support plate. The rotating shaft mechanism 10 shown in FIG. 20, FIG. 21, and FIG. 22 is used as an example. When the left support plate 12a and the left swing arm 13a are specifically disposed, the second arc-shaped chute 122 is disposed on the left support plate 12a, and correspondingly, the second arc-shaped arm 133 that is slidably mounted in the second arc-shaped chute 122 is disposed on the left swing arm 13a. A mounting relationship thereof is similar to rotation connection between the left swing arm 13a and the primary shaft component 11. When the left support plate 12a rotates relative to the left swing arm 13a, as shown in FIG. 21 and FIG. 22, when the left support plate 12a rotates to different positions, the positions are limited based on a sliding position of the second arc-shaped arm 133 in the second arc-shaped chute 122. For a specific cooperation relationship, refer to the foregoing cooperation relationship between the left swing arm 13a and the primary shaft component 11. In addition, cooperation between the right support plate 12b and the right swing arm 13b is similar, and details are not described herein again.

Figure 23:
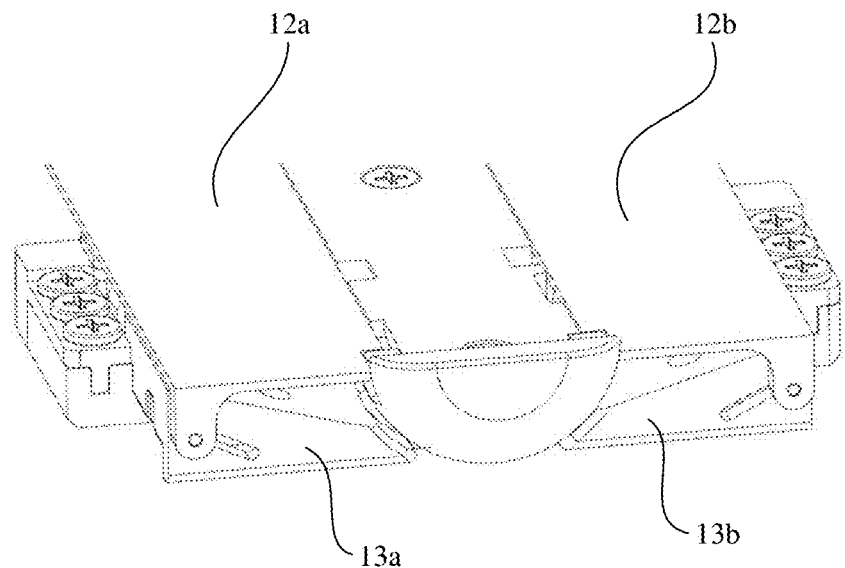
FIG. 23 is another schematic diagram of cooperation between a support plate and a swing arm according to an embodiment of this disclosure.
Figure 24:
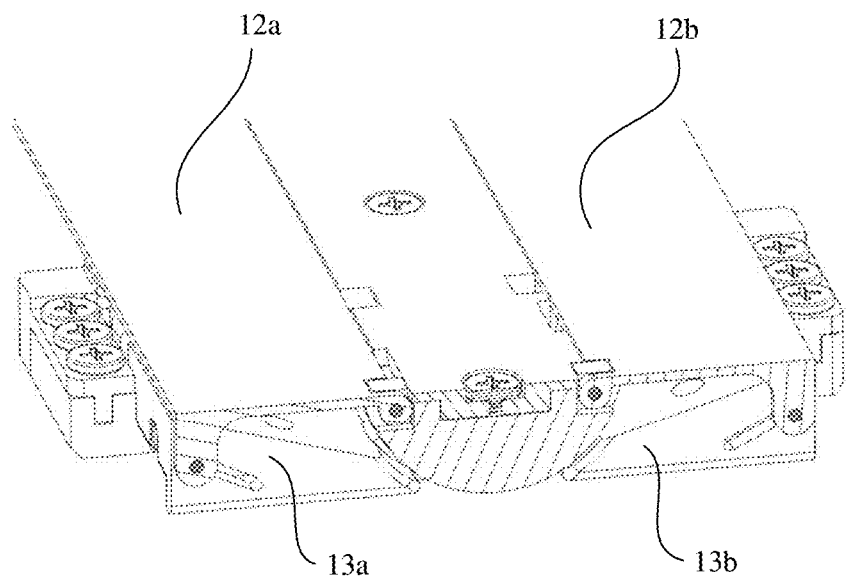
FIG. 24 is a schematic diagram of cooperation between a support plate and a swing arm when the support plate and the swing arm are unfolded according to an embodiment of this disclosure.
Figure 25:
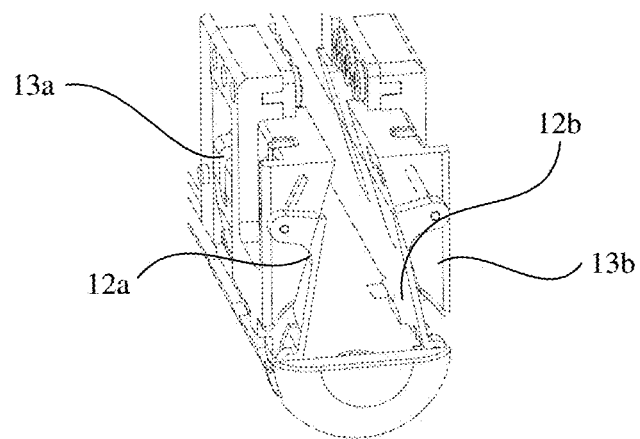
FIG. 25 is a schematic diagram of cooperation between a support plate and a swing arm when the support plate and the swing arm are folded according to an embodiment of this disclosure.

Certainly, in addition to the foregoing listed state, an embodiment of this disclosure further provides another manner of disposing the support plate. The left support plate 12a is still used as an example. When the left support plate 12a is specifically disposed, as shown in FIG. 23 and FIG. 24, the left support plate 12a is rotatably connected to the primary shaft component 11, and the left support plate 12a is slidably connected to the left swing arm 13a. As shown in FIG. 24, a right side (where a disposing direction of the support plate in FIG. 24 is used as a reference direction) of the left support plate 12a is rotatably connected to the primary shaft component 11 by using a pin shaft, and a left side of the left support plate 12a is also slidably connected to the left swing arm 13a by using a pin shaft. In addition, correspondingly, a corresponding second chute is slidably mounted on the left swing arm 13a. Certainly, alternatively, the second chute may be disposed on the left swing arm 13a, and correspondingly, a second protrusion that is slidably mounted in the second chute is disposed on the left support plate 12a. When the mobile terminal is folded, as shown in FIG. 25, the left support plate 12a rotates relative to the primary shaft component 11. In addition, because there is a relative sliding and rotation relationship between the left swing arm 13a and the primary shaft component 11, the pin shaft disposed on the left swing arm 13a drives the left support plate 12a to rotate. A connection manner of the right support plate 12b is the same as that of the left support plate 12a. Therefore, details are not described herein again. In this case, when the swing arms on the two sides of the primary shaft component 11 rotate toward each other to the first position, the corresponding swing arms drive the two support plates to rotate toward each other to the second position, so that the support plates and the primary shaft component 11 encircle to form folded space that accommodates the flexible display of the mobile terminal.

As can be learned from the foregoing descriptions, when each support plate is specifically disposed, each support plate may be rotatably connected to the swing arm located on the same side and slidably connected to the connection rod. Alternatively, each support plate may be rotatably connected to the primary shaft component 11 and slidably connected to the swing arm located on the same side. In both cases, the rotating shaft mechanism 10 may be enabled to form a supporting form of triple door plates (the left support plate 12a, the primary inner shaft 112, and the right support plate 12b), to match supporting solutions in different scenarios, ensure that the screen is smoothly and properly supported, and provide sufficient accommodation space for the screen after folding. In addition, the folded mobile terminal may be of an equal thickness while the flexible display 40 is accommodated, to avoid a bulge caused by folding.

When the primary shaft component is specifically disposed, as shown in FIG. 5, to enable the connection rod to be exposed outside the primary shaft component 11 and connected to the swing arm, a notch (not marked in the figure) is disposed on the primary outer shaft 111. In the folded state, the notch is exposed and affects appearance of the mobile terminal. Therefore, the rotating shaft mechanism 10 provided in this embodiment of this disclosure further provides a flexible covering layer 15. The flexible covering layer 15 may be made of an elastic material, for example, an elastic steel plate or an elastic plastic plate. When the mobile terminal is folded, the mobile terminal may rotate along with the rotating shaft mechanism 10.

Figure 26:
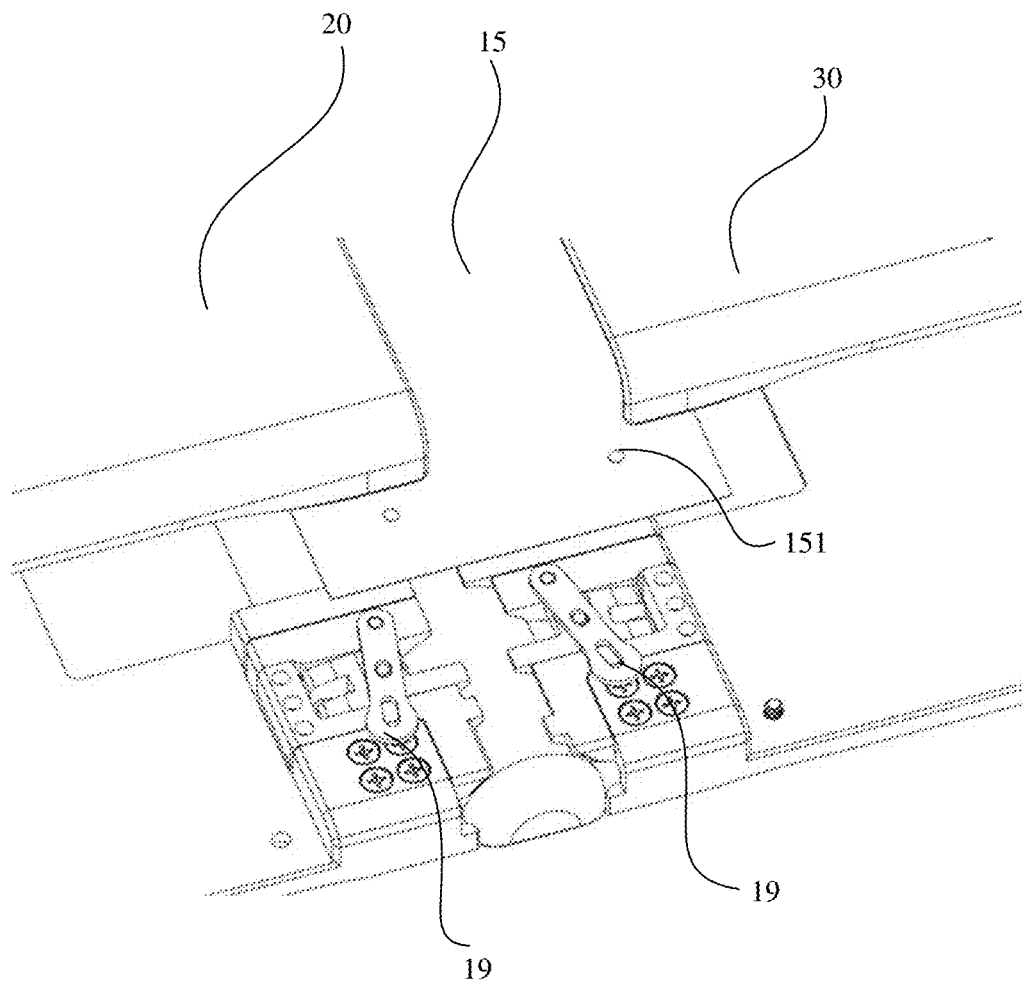
FIG. 26 is a schematic exploded view of a flexible covering layer and a swing arm according to an embodiment of this disclosure.

When the flexible covering layer 15 is specifically disposed, different connection manners may be used. In a connection manner, the flexible covering layer 15 is fixedly connected to a surface that is of the primary shaft component 11 and that is away from the flexible display 40, that is, the flexible covering layer 15 is fastened to the second surface of the primary outer shaft 111. In addition, during specific connection, the flexible covering layer 15 may not be connected to the primary outer shaft 111, or may be connected to the primary outer shaft 111 in the following manner: adhesive bonding, riveting, welding, or the like. Two ends of the flexible covering layer 15 are separately arranged on two sides of the primary outer shaft 111 and are suspended. In addition, as shown in FIG. 26, when the rotating shaft mechanism 10 is fixedly connected to the left housing 20 and the right housing 30, the two ends of the flexible covering layer 15 may be separately inserted into the left housing 20 and the right housing 30, and are in pressing contact with the left housing 20 and the right housing 30. In this case, when the mobile terminal is observed from a surface that is of the mobile terminal and that is away from the flexible display 40, the notch may be blocked by the disposed flexible covering layer 15. During bending, the flexible covering layer 15 is driven to elastically deform and rotate along with the rotating shaft mechanism 10 by pressing against the left housing 20 and the right housing 30.

Figure 27:
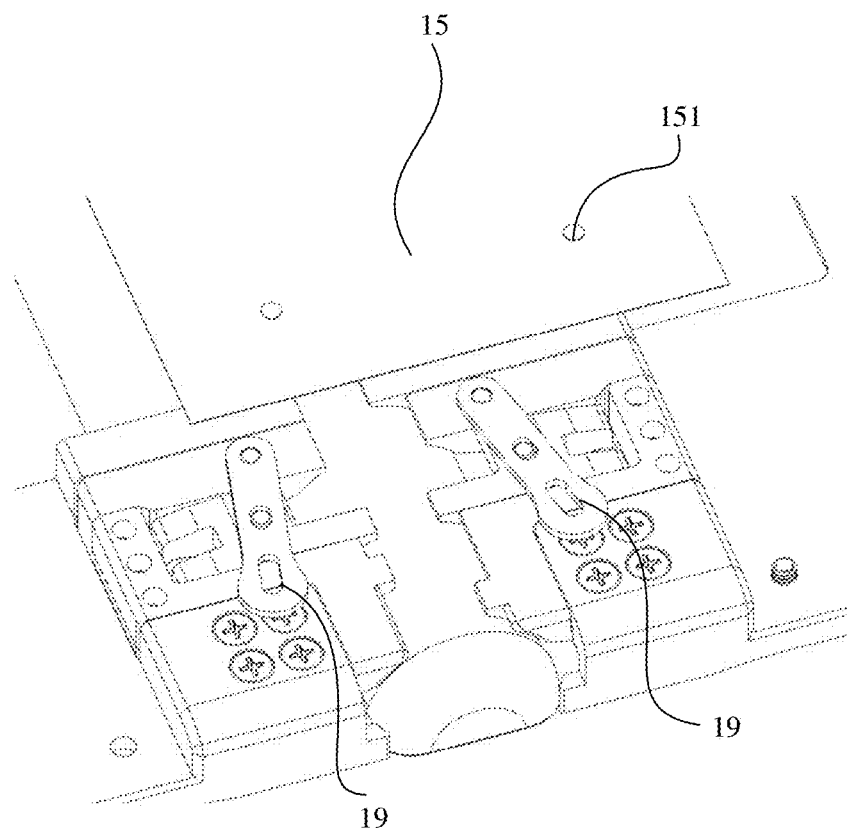
FIG. 27 is a schematic diagram of cooperation between a flexible covering layer and a swing arm according to an embodiment of this disclosure.

Certainly, the flexible covering layer 15 may be further disposed in another manner in addition to the foregoing manner. For example, the flexible covering layer 15 is fixedly connected to the surface that is of the primary shaft component 11 and that is away from the flexible display 40, that is, the flexible covering layer 15 is fastened to the second surface of the primary outer shaft 111, and may be fixedly connected in an adhesive connection manner or another connection manner during specific connection. In addition, in the disposed swing arm group, a swing rod 19 is rotatably connected to at least one swing arm, and the swing rod 19 is slidably connected to the flexible covering layer 15. FIG. 26 and FIG. 27 show a case in which the swing rod 19 is disposed in a swing arm group. When the left swing arm 13a and the right swing arm 13b are specifically disposed, the left swing arm 13a and the right swing arm 13b are separately rotatably connected to the swing rod 19, and the swing rod 19 is slidably connected to the flexible covering layer 15. During specific disposing, a pin shaft 151 corresponding to each swing rod 19 is disposed on the flexible covering layer 15, and the pin shaft 151 is clamped to a chute disposed on the swing rod 19 and may limit movement of the flexible covering layer 15 in a direction perpendicular to a surface that is of the flexible covering layer 15 and that faces the primary shaft component 11. When the left swing arm 13a and the right swing arm 13b rotate, relative displacements when the left swing arm 13a and the right swing arm 13b rotate relative to the flexible covering layer 15 are offset by rotation of the swing rod 19 and sliding of the pin shaft 151 in the chute. It should be understood that the foregoing shows a case in which the swing rod 19 is separately disposed on the left swing arm 13a and the right swing arm 13b. However, in this embodiment of this disclosure, the swing rod 19 may be disposed on only one of the swing arms, or may be disposed on a plurality of swing arms.

In addition, FIG. 26 and FIG. 27 show a case in which the swing rod 19 is disposed on the left swing arm 13a and the right swing arm 13b. However, in the rotating shaft mechanism 10 provided in this embodiment of this disclosure, the swing rod 19 may be alternatively disposed on the left connection rod 14a and the right connection rod 14b. A principle thereof is similar and only a disposing position of the swing rod 19 is changed. Therefore, details are not described herein again.

As can be learned from the foregoing descriptions, in a folding process of the entire system, the flexible covering layer 15 may always match a profile of the primary outer shaft 111 of the rotating shaft, to cover appearance at any moment in the folding process. The flexible covering layer 15 may be fastened to an outer side of the primary outer shaft in by using a process such as adhesive bonding, riveting, or welding.

Figure 28:
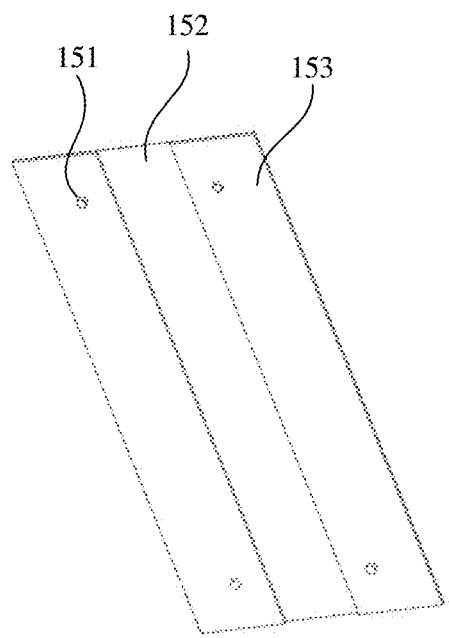
FIG. 28 is a schematic structural diagram of another flexible covering layer according to an embodiment of this disclosure.

As shown in FIG. 28, the flexible covering layer 15 may be designed as a component. A middle area 152 of the flexible covering layer 15 is a bendable area including a flexible mechanical part, and areas 153 on two sides are unbendable areas including rigid mechanical parts. In this case, the flexible covering layer 15 includes the rigid mechanical parts on left and right sides, the flexible mechanical part, and four pin shafts 153. The rigid mechanical parts and the flexible mechanical part may be connected by using adhesive bonding or welding, and the pin shaft 153 and the rigid mechanical part are connected by using a process such as riveting or welding. The pin shaft 153 may be slidably connected to the chute in the swing rod 19.

In addition, an embodiment of this disclosure further provides a mobile terminal. The mobile terminal includes the rotating shaft mechanism 10 according to any one of the foregoing descriptions and two housings, where the two housings are separately arranged on two sides of the primary shaft component 11 and each housing is fixedly connected to a swing arm located on a same side, and further includes a flexible display 40 fixedly connected to the two housings. As shown in FIG. 1 and FIG. 2, the mobile terminal includes the left housing 20 and the right housing 30, where the left housing 20 and the right housing 30 are respectively fixedly connected to the left swing arm 13a and the right swing arm 13b in the rotating shaft mechanism 10. In addition, the flexible display 40 is divided into five areas, which are respectively an A1 area, a B1 area, a C area, a B2 area, and an A2 area delimited by dotted lines in FIG. 1. The A1 area and the A2 area are respectively fixedly connected to the left housing 20 and the right housing 30, and are attached to upper surfaces of the two housings by using an adhesive during specific fixed connection. In addition, the B1 area and the B2 area correspond to areas of the left support plate 12a and the right support plate 12b, and the C1 area corresponds to an area of the first surface of the primary outer shaft 111. There are two specific adhesive bonding manners when the B1 area, the B2 area, and the C1 area are specifically connected to the first surface, the left support plate 12a, and the right support plate 12b of the rotating shaft mechanism 10. Sectional views of the two adhesive bonding manners in the folded state are separately shown in FIG. 29 and FIG. 30, and are separately described below.

Figure 29:
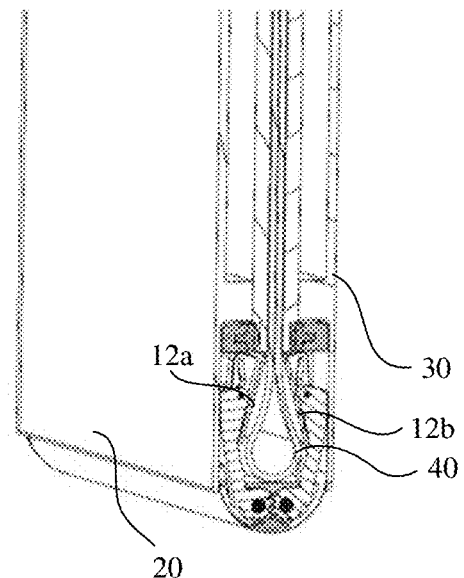
FIG. 29 is a schematic diagram of cooperation between a flexible display and a rotating shaft mechanism according to an embodiment of this disclosure.

In a first adhesive bonding manner, the A1 area is connected to the left housing 20 by adhesive bonding, the A2 area is connected to the right housing 30, and the B1 area, the B2 area, and the C area are not bonded with an adhesive and are a non-bonding area of the flexible display 40. A folded state of the screen is shown in FIG. 29. The non-bonding area of the flexible display 40 is in a water droplet shape.

Figure 30:
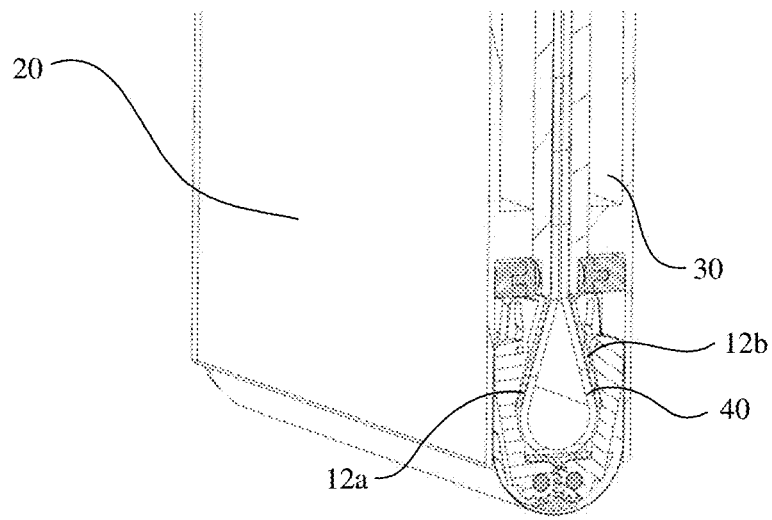
FIG. 30 is another schematic diagram of cooperation between a flexible display and a rotating shaft mechanism according to an embodiment of this disclosure.

In a second adhesive bonding manner, the A1 area of the screen is connected to the left housing 20 by adhesive bonding, the A2 area of the screen is connected to the right housing 30, the B1 area is connected to the left support plate 12a of the rotating shaft mechanism 10 by adhesive bonding, the B2 area is connected to the right support plate 12b of the rotating shaft mechanism 10 by adhesive bonding, and the C area is not bonded with an adhesive and is a non-bonding area of the screen. A foldable state of the screen is shown in FIG. 30, and the non-bonding area of the screen is in a semi-arc shape.

During using, when the rotating shaft mechanism is unfolded, the primary shaft component 11 and the support plate are configured to support the flexible display 40 of the mobile terminal. When the support plate rotates to the second position, because the swing arm and the primary shaft component 11 slide relative to each other, when the support plate rotates to the second position, the primary shaft component 11 and the support plate encircle to form space that accommodates a folded part of the flexible display 40. In addition, based on rotation of the connection rod and sliding and rotation of the swing arm relative to the rotating shaft, a thickness of the foldable mechanism after folding is approximately equal to a thickness of the two housings that are stacked together, thereby improving a folding effect of the mobile terminal. In addition, the support plate and the primary shaft component 11 encircle to form the space that accommodates the flexible display 40, thereby improving a bending effect of the flexible display 40.

As can be learned from the foregoing descriptions, the screen of the mobile terminal does not slide relative to the left housing and the right housing 30, and the rotating shaft provides sufficient concave space for the screen in the folded state, so that the non-bonding area of the flexible display 40 is hidden in the concave space in the water droplet shape or the semi-arc shape. The entire system is of an equal thickness in a closed state, and there is no relatively large gap between the housings on the two sides.

In addition, when the flexible covering layer 15 is used for covering, the flexible covering layer 15 is inserted into the two housings and is in pressing contact with the two housings. For details, refer to the descriptions in FIG. 26 and FIG. 27. The disposed flexible covering layer 15 improves a folding effect of the mobile terminal.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A rotating shaft mechanism, comprising:
    a primary shaft;
    a swing arm assembly, comprising at least one connection rod group and at least one swing arm group, wherein each connection rod group of the at least one connection rod group comprises two connection rods that are correspondingly disposed on sides of the primary shaft and that are rotatably connected to the primary shaft, each swing arm group of the at least one swing arm group comprises swing arms that are separately disposed on the sides of the primary shaft, and each of the swing arms in each of the at least one swing arm group is rotatably connected to the primary shaft, wherein each of the swing arms in each of the at least one swing arm group rotates around a first axis, and each connection rod in each of the at least one connection rod group rotates around a second axis, the first axis and the second axis are different, and both the first axis and the second axis are parallel to a length direction of the primary shaft, and wherein each of the swing arms in each of the at least one swing arm group is slidably connected to and is rotatable relative to at least one connection rod of the at least one connection rod group located on a same side of the primary shaft as the respective swing arm;
    a support, comprising support plates correspondingly disposed on the sides of the primary shaft, wherein:
        each support plate of the support plates is rotatably connected to a swing arm of the swing arms that is located on a same side of the primary shaft as the respective support plate, and each support plate of the support plates is slidably connected to and is rotatable relative to a connection rod of the at least one connection rod group that is located on the same side of the primary shaft as the respective support plate, each support plate of the support plates is rotatably connected to the corresponding swing arm around a third axis, and the third axis is parallel to the length direction of the primary shaft; or
        each support plate of the support plates is rotatably connected to the primary shaft, and is slidably connected to and is rotatable relative to a swing arm of the swing arms that is located on the same side of the primary shaft as the respective support plate, each support plate of the support plates is rotatably connected to the primary shaft around a fourth axis, and the fourth axis is parallel to the length direction of the primary shaft; and
    a position limiter, configured to limit relative sliding positions of each swing arm of each of the at least one swing arm group and each connection rod of each of the at least one connection rod group; and
    wherein when the swing arms on the sides of the primary shaft rotate toward each other to a first position, corresponding connection rods or the swing arms drive the support plates to rotate toward each other to a second position, causing the support plates and the primary shaft to encircle to form a folded space that accommodates a flexible display of a mobile terminal.

2. The rotating shaft mechanism according to claim 1, wherein, for each connection rod group of the at least one connection rod group, axes around which the two connection rods in the respective connection rod group of the at least one connection rod group rotate are symmetrically disposed on sides of axes around which the swing arms in the corresponding swing arm group rotate.

3. The rotating shaft mechanism according to claim 1, wherein a sliding direction of each connection rod of each connection rod group of the at least one connection rod group is perpendicular to an axis direction of the respective connection rod; and
    wherein when the swing arms located on the sides of the primary shaft rotate toward each other to the first position, the corresponding connection rod slides to a position next to the axis around which the corresponding swing arm rotates.

4. The rotating shaft mechanism according to claim 1, wherein the primary shaft comprises at least one first arc-shaped chute, first arc-shaped chutes of the at least one first arc-shaped chutes are in a one-to-one correspondence with the swing arms of the at least one swing arm group, and each swing arm of the at least one swing arm group comprises with a first arc-shaped arm that is slidably mounted in the corresponding first arc-shaped chute.

5. The rotating shaft mechanism according to claim 1, wherein the position limiter comprises an elastic component that is slidably mounted on a first swing arm of the swing arms, and at least two buckle openings that are disposed on a first connection rod of the at least one connection rod group and that are configured to buckle with the elastic component.

6. The rotating shaft mechanism according to claim 5, wherein the elastic component comprises a sphere and an elastic piece that pushes the sphere to buckle with a buckle opening of the at least two buckle openings.

7. The rotating shaft mechanism according to claim 6, wherein each swing arm of the swing arms corresponds to at least one connection rod of the at least connection rod group, and for each swing arm, at least one elastic component cooperating with the corresponding connection rod is disposed on the respective swing arm.

8. The rotating shaft mechanism according to claim 1, wherein, for each swing arm of the swing arms, a notch that is in a one-to-one correspondence with the corresponding connection rod is disposed on the respective swing arm, and the corresponding connection rod is at least partially located in the corresponding notch.

9. The rotating shaft mechanism according to claim 8, wherein:
a first chute is disposed on each connection rod of the at least connection rod group, and a pin shaft that is slidably mounted in the first chute is disposed on the corresponding swing arm; or
a first chute is disposed on each swing arm of the swing arms, and a first protrusion that is slidably mounted in the respective first chute is disposed on the corresponding connection rod.

10. The rotating shaft mechanism according to claim 1, wherein:
each support plate of the support plates is rotatably connected to the corresponding swing arm by using a first pin shaft; or
a second arc-shaped chute is disposed on each support plate of the support plates, and a second arc-shaped arm that is slidably mounted in the second arc-shaped chute is disposed on the swing arm corresponding to each support plate.

11. A mobile terminal, comprising:
a flexible display;
two housings; and
a rotating shaft, comprising:
a primary shaft;
a swing arm assembly, comprising at least one connection rod group and at least one swing arm group, wherein each connection rod group of the at least one connection rod group comprises two connection rods that are correspondingly disposed on sides of the primary shaft and that are rotatably connected to the primary shaft, each swing arm group of the at least one swing arm group comprises swing arms that are separately disposed on the sides of the primary shaft, and each of the swing arms in each of the at least one swing arm group is rotatably connected to the primary shaft, wherein each of the swing arm in each of the at least one swing arm group rotates around a first axis and each connection rod in each of the at least one connection rod group rotates around a second axis, the first axis and the second axis are different and are both parallel to a length direction of the primary shaft; and each of the swing arms in each of the at least one swing arm group is slidably connected to and is rotatable relative to at least one connection rod of the at least one connection rod group located on a same side of the primary shaft as the respective swing arm;
a support, comprising support plates correspondingly disposed on the sides of the primary shaft, wherein:
each support plate of the support plates is rotatably connected to a swing arm of the swing arms that is located on a same side of the primary shaft as the respective support plate, and is slidably connected to and is rotatable relative to a connection rod of the at least one connection rod group that is located on the same side of the primary shaft as the respective support plate, each support plate of the support plates is rotatably connected to the swing arm around a third axis, and the third axis is parallel to the length direction of the primary shaft; or
each support plate of the support plates is rotatably connected to the primary shaft, and is slidably connected to and is rotatable relative to a swing arm of the swing arms that is located on the same side of the primary shaft as the respective support plate, each support plate of the support plates is rotatably connected to the primary shaft around a fourth axis, and the fourth axis is parallel to the length direction of the primary shaft; and
a position limiter, configured to limit relative sliding positions each of the swing arms of each of the at least one swing arm group and each connection rod of each of the at least one connection rod group; and
wherein when the swing arms on the sides of the primary shaft rotate toward each other to a first position, corresponding connection rods or the swing arms drive the support plates to rotate toward each other to a second position, causing the support plates and the primary shaft to encircle to form a folded space that accommodates the flexible display; and
wherein the two housings are arranged on sides of the primary shaft, and each housing is fixedly connected to a swing arm of the swing arms that is located on the same side of the primary shaft as the respective housing, and the flexible display is fixedly connected to the two housings.

12. The mobile terminal according to claim 11, wherein the flexible display is bonded to the support plates.

13. The mobile terminal according to claim 11, wherein, for each connection rod group of the at least one connection rod group, axes around which the two connection rods in the respective connection rod group rotate are symmetrically disposed on sides of axes around which the swing arms in the corresponding swing arm group rotate.

14. The mobile terminal according to claim 11, wherein a sliding direction of each connection rod of each of the at least one connection rod group is perpendicular to an axis direction of the respective connection rod; and
wherein when the swing arms located on the sides of the primary shaft component rotate toward each other to the first position, the corresponding connection rod slides to a position next to the axis around which the corresponding swing arm rotates.

15. The mobile terminal according to claim 11, wherein the primary shaft comprises at least one first arc-shaped chute, first arc-shaped chutes of the at least one first arc-shaped chutes are in a one-to-one correspondence with the swing arms of the at least one swing arm group, and each of the swing arms comprises a first arc-shaped arm that is slidably mounted in the corresponding first arc-shaped chute.

16. The mobile terminal according to claim 11, wherein the position limiter comprises an elastic component that is slidably mounted on a first swing arm of the swing arms, and at least two buckle openings are disposed on a first connection rod of the at least one connection rod group and are configured to buckle with the elastic component.

17. The mobile terminal according to claim 16, wherein the elastic component comprises a sphere and an elastic piece that pushes the sphere to buckle with a buckle opening of the at least two buckle openings.

18. The mobile terminal according to claim 17, wherein each of the swing arms corresponds to at least one connection rod of the at least one connection rod group, and at least one elastic component cooperating with the corresponding connection rod is disposed on the respective swing arm.

19. The mobile terminal according to claim 11, wherein, for each of the swing arms, a notch that is in a one-to-one correspondence with the corresponding connection rod of the at least one connection rod group is disposed on the respective swing arm, and the corresponding connection rod is at least partially located in the corresponding notch.

20. The mobile terminal according to claim 11, wherein:
each support plate of the support plates is rotatably connected to the corresponding swing arm by using a first pin shaft; or a second arc-shaped chute is disposed on each support plate of the support plates, and a second arc-shaped arm that is slidably mounted in the second arc-shaped chute is disposed on the swing arm corresponding to the each support plate.

* * * * *